United States Patent
Smaragdis et al.

(10) Patent No.: US 7,937,270 B2
(45) Date of Patent: May 3, 2011

(54) SYSTEM AND METHOD FOR RECOGNIZING SPEECH SECURELY USING A SECURE MULTI-PARTY COMPUTATION PROTOCOL

(75) Inventors: Paris Smaragdis, Brookline, MA (US); Madhusudana Shashanka, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 800 days.

(21) Appl. No.: 11/623,522

(22) Filed: Jan. 16, 2007

(65) Prior Publication Data

US 2008/0172233 A1  Jul. 17, 2008

(51) Int. Cl.
  *G10L 15/00* (2006.01)
(52) U.S. Cl. ............... 704/256; 380/28; 704/273
(58) Field of Classification Search .......... 704/256, 704/273; 380/28
  See application file for complete search history.

(56) References Cited

U.S. PATENT DOCUMENTS

| | | | | |
|---|---|---|---|---|
| 5,495,532 | A * | 2/1996 | Kilian et al. ............ | 380/30 |
| 5,615,269 | A * | 3/1997 | Micali ..................... | 705/80 |
| 5,960,399 | A * | 9/1999 | Barclay et al. .......... | 704/270.1 |
| 6,772,339 | B1 * | 8/2004 | Jakobsson et al. ...... | 713/168 |
| 7,526,084 | B2 * | 4/2009 | Smaragdis et al. ..... | 380/28 |
| 7,577,252 | B2 * | 8/2009 | Avidan et al. ........... | 380/216 |
| 7,711,616 | B2 * | 5/2010 | Knapp ..................... | 705/35 |
| 2006/0178887 | A1 * | 8/2006 | Webber ................... | 704/256 |
| 2007/0081664 | A1 * | 4/2007 | Avidan et al. ........... | 380/28 |
| 2007/0116283 | A1 * | 5/2007 | Tuyls et al. ............. | 380/255 |
| 2008/0046865 | A1 * | 2/2008 | Kerschbaum ........... | 717/106 |

OTHER PUBLICATIONS

Shashanka, M.V.S., and Smaragdis, P. "Secure Sound Classification: Gaussian Mixture Models." IEEE, 2006.*
Huang, Y. et al. "Privacy Preserving association rule mining with scalar product." IEEE Natural Language Processing and Knowledge Engineering 2005, NLP-KE '05.*
Yao, A. "Protocols for Secure Computations." University of California; 1982.*
L. R. Rabiner, "A tutorial on hidden Markov models and selected applications in speech recognition," Proceedings of the IEEE, vol. 77, No. 2, pp. 257-286, Feb. 1989.
M. J. Atallah, F. Kerschbaum, and W. Du, "Secure and private sequence comparisons," in Proceedings of Workshop on Privacy in the Electronic Society, Washington, DC, USA, Oct. 2003.
Shashanka et al., "Secure sound classification: Gaussian mixture models," Acoustics, Speech and Signal Processing, 2006, ICASSP 2006 Proceedings, 2006 IEEE International Conference, vol. 3, pp. 1088-1091 Proc, May 2006.

(Continued)

*Primary Examiner* — Talivaldis Ivars Smits
*Assistant Examiner* — Shaun Roberts
(74) *Attorney, Agent, or Firm* — Dirk Brinkman; Gene Vinokur

(57) ABSTRACT

A system and method recognizes speech securely using a secure multi-party computation protocol. The system includes a client and a server. The client is configured to provide securely speech in a form of an observation sequence of symbols, and the server is configured to provide securely a multiple trained hidden Markov models (HMMs), each trained HMM including a multiple states, a state transition probability distribution and an initial state distribution, and each state including a subset of the observation symbols and an observation symbol probability distribution. The observation symbol probability distributions are modeled by mixtures of Gaussian distributions. Also included are means for determining securely, for each HMM, a likelihood the observation sequence is produced by the states of the HMM, and means for determining a particular symbol with a maximum likelihood of a particular subset of the symbols corresponding to the speech.

14 Claims, 9 Drawing Sheets

OTHER PUBLICATIONS

B. Goethals, S. Laur, H. Lipmaa, and T. Mielikainen, "On private scalar product computation for privacy-preserving data mining," C. Park and S. Chee, editors, Intl, Conference on Information Security and Cryptology, vol. 2506 of Lecture Notes in Computer Science, pp. 104-120, 2004.

* cited by examiner

200

HMM_EVAL
700

SYSTEM AND METHOD FOR RECOGNIZING SPEECH SECURELY USING A SECURE MULTI-PARTY COMPUTATION PROTOCOL

FIELD OF THE INVENTION

This invention relates generally to speech recognition, and more particularly to recognizing speech securely.

BACKGROUND OF THE INVENTION

Secure Multi-Party Computation

With the widespread availability of communication networks, such as the Internet, it is now common to 'outsource' data processing tasks to third parties for a number of reasons. For example, the processing can be done at a reduced cost, or the third party has better computational resources or better technologies. One concern with outsourcing data processing is an inappropriate use of confidential information by third parties.

A user or client computer system, perhaps with limited data processing resources, desires to recognize speech. A third party or server computer system has some of the necessary resources. Conventionally, the client and the server are usually called Alice and Bob, respectively. Speech recognition could easily be a part of this trend, where now third-party servers provide speech recognition services for remote clients.

The private nature of speech data however is a stumbling block for such a development. Individuals, corporations and governments are understandably reluctant to send private speech through a network to another party that cannot be trusted.

It is desired to have the third party sever recognize the speech without revealing the speech to the third party. At the same time, the third party wants to keep its speech recognizer secret. For such applications, conventional cryptography protects only the speech during transport, and not the processing by the third party.

Secure multi-party computations (SMC) are often analyzed for correctness, security, and overhead. Correctness measures how close a secure process approaches an ideal solution. Security measures the amount of information that can be gained from the multi-party exchange. Overhead is a measure of complexity and efficiency.

A multi-party protocol between Alice and Bob is secure when privacy and correctness are guaranteed for both Alice and Bob. The protocol protects privacy when the information that is 'leaked' by the distributed computation is limited to the information that can be learned from the designated output of the computation.

In a semi-honest case, both parties follow the protocol as prescribed but may record all messages and subsequently deduce information not derivable solely from the protocol output. In the malicious case, however, no assumption is made about: the behavior of the parties. It: is required that the privacy of one party is preserved even in the case of an arbitrary behavior of another party. A protocol in the semi-honest case can be made secure in the malicious case when accompanied with zero-knowledge proofs that both parties follow the protocol.

Zero Knowledge Protocols

Zero-knowledge or secure multi-party protocols were first described by Yao, "How to generate and exchange secrets," Proceedings of the 27th IEEE Symposium on Foundations of Computer Science, pp. 162-167, 1986, incorporated herein by reference. Later, that: zero-knowledge technique was extended to other problems, Goldreich et al., "How to play any mental game—a completeness theorem for protocols with honest majority," 19th ACM Symposium on the Theory of Computing, pp 218-229, 1987, incorporated herein by reference. However, those theoretical constructs are still too demanding to be of any use for practical applications.

Since then, many secure methods have been described, Chang et: al., "Oblivious Polynomial Evaluation and Oblivious Neural Learning," Advances in Cryptology, Asiacrypt '01, Lecture Notes in Computer Science Vol. 2248, pages 369-384, 2001, Clifton et al., "Tools for Privacy Preserving Distributed Data Mining," SIGKDD Explorations, 4(2); 28-34, 2002, Koller et al, "Protected Interactive 3D Graphics Via Remote Rendering," SIGGRAPH 2004, Lindell et al., "Privacy preserving data mining," Advances in Cryptology—Crypto 2000, LNCS 1880, 2000, Naor et al., "Oblivious Polynomial Evaluation." Proc. of the 31st Symp. on Theory of Computer Science (STOC), pp. 245-254, May 1999, and Du et al., "Privacy-preserving cooperative scientific computations," 4th IEEE Computer Security Foundations Workshop, pp. 273-282, Jun. 11, 2001, all incorporated herein by reference.

Secure Inner Dot Products

A large number of computer implemented methods and applications require that one computes an inner product. Therefore, protocols and procedures for determining a secure inner dot product (SIP) have been developed. It is understood that these protocols are known to those of ordinary skill in the art.

The protocols can be categorized broadly as cryptographic protocols and algebraic protocols. The protocols provide different levels of security and efficiency. Because the computational cost, in general, is constantly decreasing, the main concern in evaluating the protocols is security and communication costs.

Generally, an inner dot product of two vectors x and y produces two scalar values a and b according to $x^T y = a+b$, where T is the transpose operator.

Cryptographic Protocols

Several methods are known for providing secure inner dot products, see B. Goethals, S. Lain, H. Lipmaa, and T, Mielikainen, "On private scalar product computation for privacy-preserving data mining," C. Park and S. Chee, editors, Intl. Conference on Information Security and Cryptology, volume 2506 of Lecture Notes in Computer Science, pages 104-120, 2004; X Feigenbaum, Y. .Ishai, T. Malkin, K, Nissim, M. Strauss, and R, N. Wright, "Secure multi-party computation of approximations," Proceedings of the Intl. Colloquium on Automata, Languages and Programming, volume 2076 of Lecture Notes in Computer Science, pages 927-938, 2001; R. Canetti, Y. Ishai, R. Kumar, M, K. Reiter, R. Rubinfeld, and R. N. Wright, "Selective private function evaluation with applications to private statistics," Proceedings of the ACM symposium on principles of distributed computing, pages 293-304, 2001, all incorporated herein by reference.

The Goetbal, et al. protocol has as input private vectors x, y, belonging to Bob and Alice respectively, and as output the scalar values a and b such that $a+b=x^T y$. During an initialization phase, Bob generates a private and public key pair (sk, pk). Bob sends pk to Alice. Then, for each $i \in \{1, \ldots, d\}$. Bob generates a new random string $r_i$, and sends $c_i = En(pk; x_i, r_i)$ to Alice. In response, Alice sets $$z \leftarrow \prod_{i=1}^{d} c_i^{y_i},$$

generates a random plaintext b and a random nonce r', and sends z'=z·En(pk; −b, r') to Bob. Then, Bob determines a=De(sk; z')=$x^T$y−b. They describe a proof that the protocol is correct and secure. It can also be shown that the communication overhead is k'/τ, where k' is the bit size of each encrypted message sent by Alice, and τ=$\lfloor\sqrt{m/d}\rfloor$ for a large m. In a homomorphic cryptosystem, typical values would be k'≈2048 and m≈$2^{1024}$, see Pascal Paillier, "Public-key cryptosystems based on composite degree residuosity classes," J. Stern, editor. Proceedings of Advances in Cryptology—EUROCRYPT '99, volume 1592 of Lecture Notes in Computer Science, pages 223-238,1999, and Ivan Damgard and Mads Jurik, "A generalization, simplification and some applications of Paillier's probabilistic public-key system," Proceedings of the Intl. Workshop on Practice and Theory in Public Key Cryptography, volume 1992 of Lecture Notes in Computer Science, pages 119-136, 2001, all incorporated herein by reference.

Another protocol uses the technique of oblivious polynomial evaluation (OPE), see Moni Naor and Benny Pinkas, "Oblivious transfer and polynomial evaluation," Proceedings of the thirty-first annual ACM symposium on Theory of computing, pages 245-254, 1999, incorporated herein by reference. The protocol uses an additive oracle, which computes every term $x_j y_j$ of the dot product $x^T y$ and expresses the $j^{th}$ term as $S_{A_j}+S_{B_j}$. Alice and Bob receive $S_{A_j}$ and $S_{B_j}$, respectively for all j. The result $x^T y$ is given by $$\sum_{i=1}^{d} S_{A_i} + \sum_{i=1}^{d} S_{B_i}.$$

Alice and Bob can implement the additive oracle using the OPE.

Canetti, et al. describe a protocol, which uses homomorphic encryption, for determining a weighted sum of a set of numbers from a data base. Feigenbaum, et al., describe a protocol to determine the $L^2$ distance between two vectors, see Feigenbaum, Y. Ishai, T. Malkin, K. Nissim, M. Strauss, and R. N. Wright, Secure multi-party computation of approximations," Proceedings of the Intl. Colloquium on Automata, Languages and Programming, volume 2076 of Lecture Notes in Computer Science, pages 927-938, 2001, all incorporated herein by reference. Both of those protocols can be used to determine dot-products securely.

Algebraic Protocols

Algebraic protocols can also be used for determining secure dot products, However, most of these protocols leak some information, see W. Du and M, J. Atallah, "Privacy-preserving cooperative statistical analysis," Proceedings of the 17th Annual Computer Security Applications Conference, December 2001; W. Du and Z. Zhan, "A practical approach to solve secure multi-party computation problems," Proceedings of New Security Paradigms Workshop, Sep. 23-26 2002; I. Ioannidis, A, Grama, and M. Atallah, "A secure protocol for computing dot-products in clustered and distributed environments," Proceedings of the Intl. Conf. on Parallel Processing, 2002; P. Ravikuniar, W. W, Cohen, and S, E. Fienberg, "A secure protocol for computing string distance metrics," Proceedings of the Workshop on Privacy and Security Aspects of Data Mining, pages 40-46, Brighton, UK, 2004; and J. Vaidya and C. Clifton, "Privacy preserving association rule mining in vertically partitioned data," Proceedings of the Intl. Conf on Knowledge Discovery and Data Mining. The properties and weaknesses of some of these protocols have been analyzed, see E. Kiltz, G, Leander, and J. Malone-Lee, "Secure computation of the mean and related statistics," Proceedings of the Theory of Cryptography Conference, volume 3378 of Lecture Notes in Computer Science, pages 283-302, 2005 and B. Goethals, S. Laur, H. Lipmaa, and T. Mielikainen, "On private scalar product computation for privacy-preserving data mining," C. Park and S. Chee, editors, Intl., Conference on Information Security and Cryptology, volume 2506 of Lecture Notes in Computer Science, pages 104-120, 2004, all incorporated herein by reference.

The basic idea in the protocols of Du, et al., is to express the vector x as a sum or M random vectors, i.e., $$\sum_{m=1}^{M} u_m.$$

For every m, Alice sends $u_m$ concealed in a set of k random vectors. Bob computes the dot product with y for all the vectors, and adds a random number $r_m$ to all products. The results are sent to Alice. Alice and Bob repeat this M times. Finally, Alice and Bob have $$\sum_{m=1}^{M}(u_m^t y + r_m) \text{ and } -\sum_{m=1}^{M} r_m,$$

respectively, which when added gives the required result.

Du, et al. use random permutations, Let π(x) be a vector whose elements are a random permutations of elements of x. The product $\pi(x)^T \pi(y)$ is equal to $x^T y$. Bob expresses y as the sum of M random vectors, i.e., $$y = \sum_{m=1}^{M} v_m.$$

Bob generates m random vectors $r_i$ and m random permutations $\pi_m$. For each m, Alice learns $\pi_m(x+r_m)$ without learning $\pi_m$ or $r_m$, using a homomorphic encryption scheme as in Du, et al. Bob sends $\pi_m(v_m)$ to Alice, and Alice computes $\pi_m(x+r_m)^t \pi_m(v_m)$. Finally, Alice has $$\sum_{m=1}^{M}(x^t v_m + r_m^t v_m),$$

and Bob has $$-\sum_{m=1}^{M}(r_m^t v_m)$$

which together form the result. Alice's chances of successfully guessing all elements in y is $$\left(\frac{1}{d!}\right)^M.$$

Another protocol assumes that the number of elements d in the data vector x is even, A vector $x_1$ is defined as d/2 dimension vector including the first d/2 elements of the vector x, and the vector $x_2$ includes the last, d/2 elements of x, and $x^T y = x^T_1 y_1 + x^T_2 y_2$. Alice and Bob jointly generate a random invertible d×d matrix M. Alice computes $x' = x^T M$, which is partitioned into $x'_1$ and $x'_2$, and sends $x'_2$ to Bob. Bob computes $y' = M^{-1} y$, splits it as $y'_1$ and $y'_2$ and sends $y'_1$ to Alice. Alice computes $x'_1 y'_1$ and Bob computes $x+_2 y'_2$ so that their sum is the required result.

Other algebraic protocols for determining dot products are also known, see I. Ioannidis, A. Grama, and M. Atallah, "A secure protocol for computing dot-products in clustered and distributed environments," Proceedings of the Intl. Conf. on Parallel Processing, 2002; J. Vaidya and C. Clifton, "Privacy preserving association rule mining in vertically partitioned data," Proceedings of the Intl. Conf. on Knowledge Discovery and Data Mining, 2002, and P. Ravikumar, W, W. Cohen, and S. E. Fienberg, "A secure protocol for computing string distance metrics," Proceedings of the Workshop on Privacy and Security Aspects of Data Mining, pages 40-46, 2004, all incorporated herein by reference.

Classifiers

Data classification is well known. If the data have a multivariate distribution, then the classifier typically uses multivariate Gaussian distributions. Each class can be modeled by either a single multivariate Gaussian distribution, or a mixture of multivariate Gaussian distributions.

The classifier determines a value of a discriminant function $$g_i(x) = \ln p(x|\omega_i) + \ln P(\omega_i)$$

for all classes $\omega_i$ and assign the data x to class $\omega_i$, if $g_i(x) > g_j(x)$ for all $j \neq i$. Here, $p(x|\omega_i)$ is a class-conditional probability density function, and $P(\omega_i)$ is an a priori probability of class $\omega_i$.

Single Multivariate Gaussian Distribution

The mean vector and covariance matrix of the $i^{th}$ class are $\mu_i$ and $\Sigma_i$, respectively. Hence, $p(x|\omega_i) \sim (\mu_i, \Sigma_i)$, and the above Equation can be expressed as:

$$g_i(x) = -\frac{1}{2}(x - \mu_i)^t \sum_i^{-1} (x - \mu_i) - \frac{d}{2}\ln 2\pi - \frac{1}{2}\ln\left|\sum_i\right| + \ln P(\omega_i).$$

If the term (d/2) ln $2\pi$ term is ignored, then this can be rewritten as:

$$g_i(x) = x^t \overline{W}_i x + \overline{w}'_i x + w_{i0},$$

where $$\overline{W}_i = -\frac{1}{2}\sum_i^{-1},$$

$$\overline{w}_i = \sum_i^{-1} \mu_i, \text{ and}$$

$$w_{i0} = -\frac{1}{2}\mu_i^t \sum_i^{-1} \mu_i - \frac{1}{2}\ln\left|\sum_i\right| + \ln P(\omega_i).$$

Vectors of (d+1)-dimensions, $\overline{x}$ and $\overline{w}_i$, can be generated by appending the value 1 to the vector x, and appending an element $w_{i0}$ to the vector $\overline{w}_i$. By changing the matrix $\overline{W}_i$ into a (d+1)×(d+1) matrix $W_i$, where the first d components of the last row are zeros and the last column is equal to $w_i^t$, $g_i(x) = x^t \overline{W}_i x + \overline{w}'_i x + w_{i0}$, can be written as:

$$g_i(x) = \overline{x}^t W_i \overline{x}.$$

Expressing $\overline{x}$ as x, the above Equation becomes:

$$g_i(x) = x^t W_i x.$$

Mixture of Distributions Gaussian

The mean vector and covariance matrix of the $j^{th}$ Gaussian distribution in class $\omega_i$ are $\mu_{ij}$ and $\Sigma_{ij}$, respectively. Hence, $$p(x|\omega_i) = \sum_{j=1}^{J_i} \alpha_{ij} \aleph\left(\mu_{ij}, \sum_{ij}\right),$$

where $J_i$ is the number of Gaussian distributions describing class $\omega_i$, and $\alpha_{ij}$ are the coefficients of the mixture of Gaussian distributions.

A log likelihood for the $j^{th}$ Gaussian distribution in the $i_{th}$ class is given by $$l_{ij}(x) = x^t \overline{W}_{ij} x + \overline{w}'_{ij} x + w_{ij},$$

where $$\overline{W}_{ij} = -\frac{1}{2}\sum_{ij}^{-1}, \overline{w}_{ij} = \sum_{ij}^{-1} \mu_{ij},$$

and $$w_{ij} = -\frac{1}{2}\mu_i^t \sum_{ij}^{-1} \mu_{ij} - \frac{1}{2}\ln\left|\sum_{ij}\right|.$$

Expressing x as a (d+1)-dimensional vector, and $\overline{W}_{ij}$, $\overline{w}_{ij}$, $w_{ij}$ together as the (d+1)×(d+1) matrix $W_{ij}$, as described before, the above Equation becomes:

$$l_{ij}(x) = x^t W_{ij} x.$$

Hence, the discriminant function for the $i_{th}$ class can be written as $$g_i(x) = \log \text{sum}(\ln \alpha_{i1} + l_{i1}(x), \ldots, \ln \alpha_{iJ_i} + l_{iJ_i}(x)) + \ln P(\omega_i).$$

where $$\text{logsum}(x_1, \ldots, x_{J_i}) = \max(x_1, \ldots, x_{J_i}) + \ln\left(\sum_{j=1}^{J_i} e^{\Delta_j}\right),$$

and $$\Delta_j = x_j - \max(x_1, \ldots, x_{J_i}) \; \forall j \in \{1, \ldots, J_i\}.$$

Hereinafter, the data vector x denotes a (d+1)-dimensional vector with a last component equal to 1, unless stated otherwise.

Many conventional speech recognizer typically use hidden Markov models (HMMs) and mixtures of Gaussian distributions. It is desired to train such a speech recognizer in a secure manner. That is, the speech supplies by a client for the training remains secret, and the HMMs remain secret as well. After the recognizer is trained, it is also desired to evaluate the performance of the recognizer as it: is being trained, and to use the trained recognizer to recognize speech in a secure manner. The recognized speech is called a transcription.

SUMMARY OF THE INVENTION

The embodiments of the invention implement a system and method that enable privacy-preserving speech recognition between two parties. One party, a client or Alice, with private speech and one party, a server or Bob, with a private speech recognizer. It is a goal of the invention to enable these parties to perform a speech recognition task without revealing their private information to each other.

The protocols described herein can be used to train a speech recognition system and can be extended for arbitrary audio and speech processing.

The collaborative model according to the embodiments of the invention can be realized with no privacy leaks from any involved party. The invention provides hidden Markov models (HMM) in a secure framework that enables training and classification between multiple parties, some having private speech data and some having private HMM model for speech recognition.

The client does not have to share any information about the speech, and the server does not share any information on the HMM model. After evaluation, the transcript of the speech is revealed to the client, and not to the server that provide the HMM model, thereby providing privacy at both the data, and the semantic levels.

In one embodiment, the HMMs are trained from data provided by multiple parties, and another embodiment deals with evaluating already trained HMMs on data, from another party. These embodiments are useful for collaborative speech recognition.

One embodiment can enable model training on multiple speech data bases without requiring the disclosure of actual speech, and another embodiment can enable speech recognition as a service model to remote clients who wish to maintain privacy on their speech and their transcription from both the service provider and malicious intruders.

Theses constrains can be satisfied using a secure multi-party computation (SMC), SMC is a field of cryptography that provides means to perform arbitrary computations between multiple parties who are concerned with protecting their data. The invention provides a SMC formulation for training and evaluating HMMs as applied to speech recognition. The HMMs can be modeled by mixtures of Gaussian distributions.

It is believed that this is the first application of SMC to privacy constrained speech recognition.

DETAILED DESCRIPTION OF THE PREFERRED EMBODIMENTS

Speech Recognition with Hidden Markov Models

Figure 1:
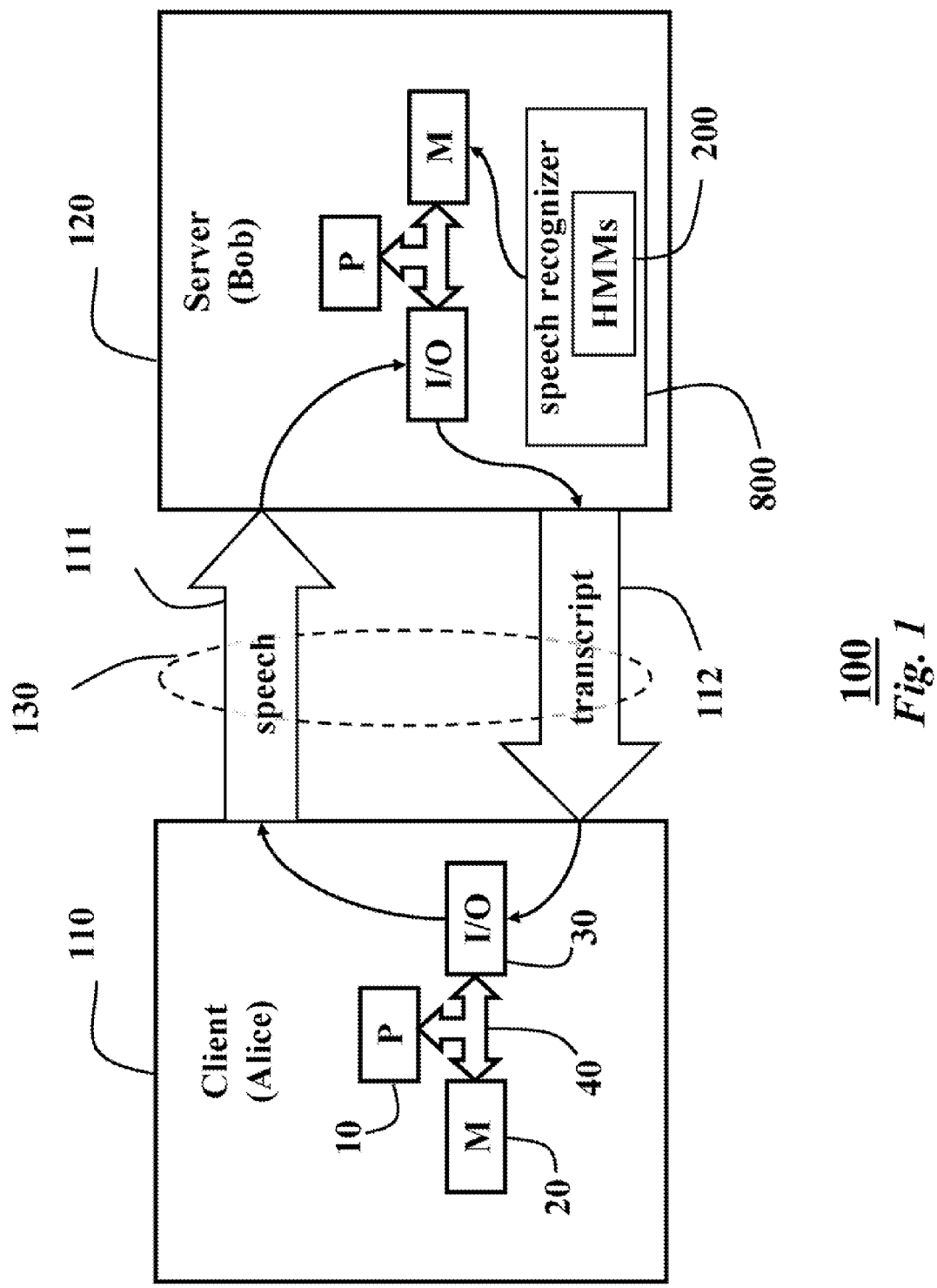
FIG. 1 is a block, diagram of secure speech recognition according to an embodiment of the invention.

As shown in FIG. 1, the embodiments of our invention implement a system and method 100 for recognizing speech securely, A client (Alice) 110 provides private speech 111. Typically, features in the acoustic speech signal are encoded as a feature vector. Any known feature can be used, e.g., mel frequency cepstral coefficients (MFCCs). Therefore, hereinafter, the term 'speech' generally means speech in the form of & feature vector. Linear predictive coding (LPC) can also be used.

A server (Bob) 120 provides a speech recognizer 800. The client and server are connected by a network 130, e.g., the Internet. The recognizer converts the speech 111 to a transcript 112, e.g., text. The speech recognizer 800 uses hidden Markov models (HMMs) 200, In our speech recognition, the HMMs can correspond to speech recognition units, e.g., letters, words, phonemes, syllables, word units, phrase, or other speech sounds longer than words, or several syllables.

The client and the server are conventional. Each can include a processor (P) 10, memory (M) 20, and I/O interfaces 30 connected by buses 40 as known in the art. It presumed that the I/O interface 30 can acquire speech, forward speech, and present the transcript 112 to the user.

What is unconventional about our system method is that the client 110 does not want to reveal the speech 111 nor the transcript 112, and the server 120 does not want to reveal the workings of the recognizer 120 to the client, i.e., the HMMs, However, conventional cryptographic protocols can only secure the privacy of the speech and transcript on the network 130, and not in the recognizer 120.

Figure 2:
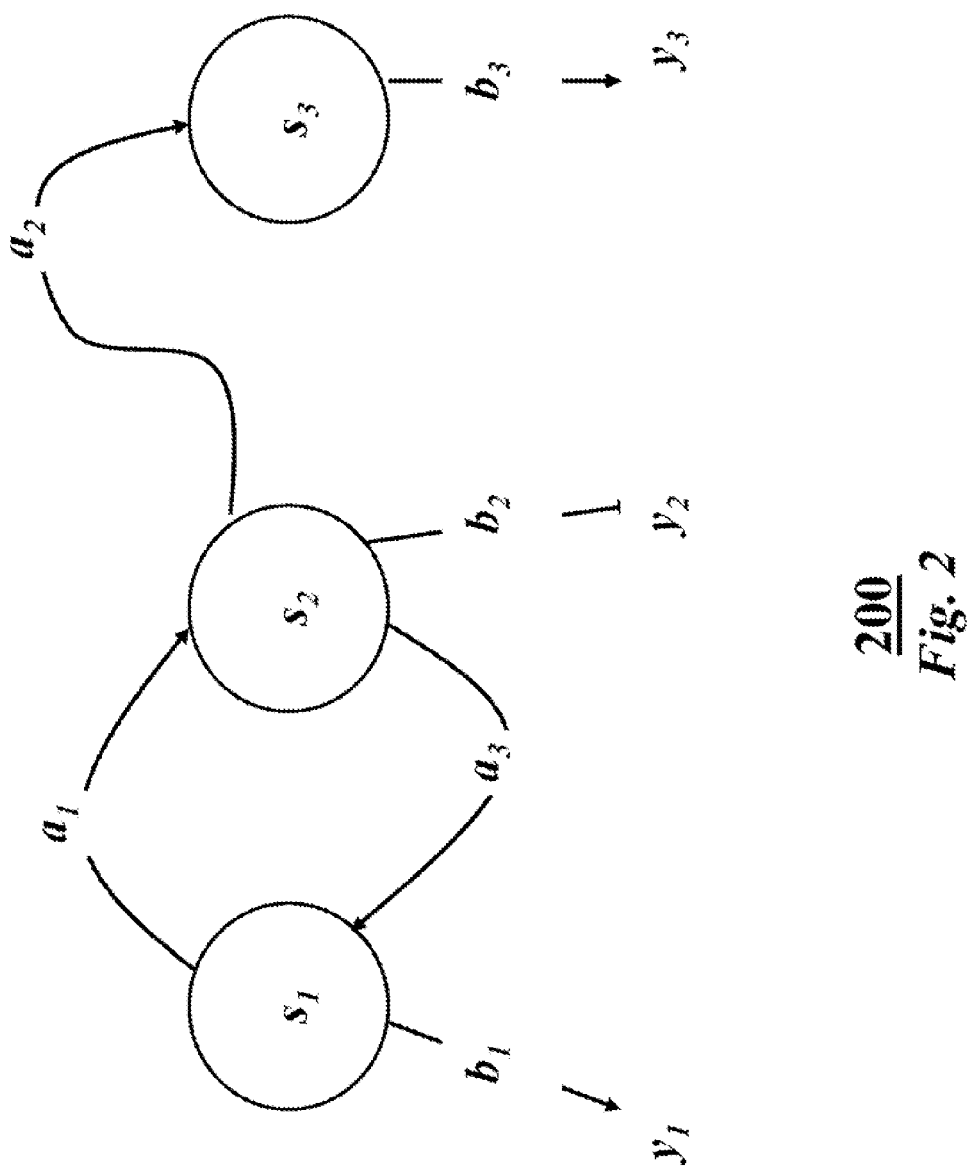
FIG. 2 is a diagram of a hidden Markov model according to an embodiment of the invention.

FIG. 2 shows an example HMM 200 with hidden states s, observable output y, transition probabilities a, and output probabilities b. In an embodiment of the invention, the transition probabilities of the HMM are modeled by mixtures of multivariate Gaussian distributions. The transition probabilities give the likelihoods that the transcript 112 corresponds to the speech 111.

HMM Design Problems

There are three fundamental problems for HMM design, namely:

1) the determination of a likelihood the observation sequence (speech) is produced by a particular HMM;

2) the determination of a best sequence of state transitions for the observation sequence; and 3) the adjustment of parameters of the HMM so as to best account for the observed sequence.

The first problem is one of determining the likelihood that a particular model matches the given observation sequence (speech). The second problem is to uncover the hidden part of the HMM. We use a secure Viterbi protocol to solve this problem. The third problem is the problem of training the HMMs.

Unsecure methods for the above three problems for conventional speech recognition are well known and described in detail by L. R, Rabiner, "A tutorial on hidden Markov models and selected applications in speech recognition," Proceedings of the IEEE, vol. 77, no. 2, pp. 257-286, February 1989, incorporated herein by reference. However, how to solve these problems in a secure manner has not yet been considered in prior art speech recognizers.

We describe these problems using secure multi-party computations between a client and a server, named conventionally Alice 110 and Bob 120. Suppose Bob has the HMMs 200 with all the model parameters λ trained.

The model parameters λ of each HMM can be characterized as N states $\{S_1, \ldots, S_N\}$, the state of the HMM at time t is $q_t$, state transition probability distribution $A=\{a_{ij}\}$, where $$a_{ij}=P[q_t+1=S_j|q_t=S_i], \text{ for } 1 \leq i,j \leq N. \quad (1)$$

Each state is associated with a subset of M distinct observation symbols, i.e., the HMM has a codebook with a discrete alphabet: size or vocabulary, The subset of the observation symbols correspond to the physical output of the system being modeled. The observation symbol probability distribution in state j is given by a mixture of Gaussian distributions $$b_j(x) = \sum_{m=1}^{M} c_{jm} N\left(\mu_{jm}, \sum_{jm}\right), \quad 1 \leq j \leq N, \quad (2)$$

where x is the variable, $c_{jm}$ is the mixture coefficient for the $m^{th}$ mixture in state j, and $\mathcal{N}(.)$ is a Gaussian distribution with a mean vector μ, and a covariance matrix $\Sigma_{jm}$. An initial state distribution is $\pi=\{\pi_i\}$, where $$\pi_i=P[q_1=S_i], 1 \leq N. \quad (3)$$

We use λ to denote the entire parameter set of the HMM model. Consider the first two problems where Bob has the trained the HMM 200 with all the model parameters λ are trained.

Alice has the observation sequence $X=x_1 x_2 \ldots x_T$, i.e., the speech feature vector 111.

We describe how Alice can securely determine the probability or likelihood $P(X|\lambda)$ of the observation sequence given a particular HMM, using & forward-backward procedure. We also describe how one can securely determine the best sequence of model states using a secure Viterbi protocol. When there is a secure way of determining likelihoods, the method can be extended to applications, such as speech recognition.

Bob has trained several HMMs, which characterize various forms of speech. Each HMM corresponds to a unit of recognizable speech, e.g., a word or phoneme. Alice's observation sequence vector 111 corresponds to a small portion of speech. We assume that Alice knows the features that Bob has used to train his HMMs, and has represented her speech vector in terms of those features. Then, we describe how Alice and Bob can obtain additive shares of the likelihood of Alice's observation sequence for every speech recognition unit of Bob, and use the additive shares to determine the speech unit that corresponds to Alice's speech.

Now consider the third problem of training. The problem of security arises when Bob wants to train the HMM, or do data mining in general, on combined data from private data bases 'owned' by Alice and another client (Charlie), For example. Bob wants to train his recognizer for different forms of speech. We describe how Bob can securely re-estimate parameters of his HMM without gaining knowledge about the private data. The implicit assumption is that Alice and Charlie are willing to let Bob learn about: distributions of their private data, We describe how Bob can securely re-estimate parameters of his HMMs 200 without gaining knowledge about the private data 111, The implicit assumption is that Alice allows Bob to learn about distributions of the data. It should be understood, that the training can be performed for any number of clients.

Secure Two-Party Computations

The speech recognition that we describe is a specific implementation of a secure multi-party computation (SMC). We describe the case where Alice and Bob have private data, e.g., vectors a and b, respectively, and they want to determine the result c of a function $f(a, b)$, see FIG. 3.

The SMC can be implemented, in part, in the client 110, the server 120, by a third party. In a preferred embodiment, it is assumed that the client has limited resources and is therefore relatively simple, e.g., a desktop or handheld device such as a mobile telephone, and the sever can be more complex. Therefore, the SMC is usually implemented in the server.

Consider a third-party who can take the private data, determine the result, and communicate the result to the parties. Any protocol that determines c is said to be secure only if the protocol reveals no more information about a and b than what one can gain from learning the result c from the third-party.

We assume a semi-honest model for the parties, where the parties follow the protocol but could be saving messages and intermediate results to learn more about other's private data. In other words, the parties are honest hut curious and follow the agreed-upon protocol, but try to learn as much as possible from the data flow between the parties.

In a malicious model, no such assumptions are made about the behavior of the parties. If both, parties are malicious, security can be enforced by accompanying the protocols with zero-knowledge proofs, as described above, that the protocols are indeed being followed. If only one of the parties is malicious, the other party can use conditional disclosure of secrets protocols to make sure the other party receives valid inputs from the malicious party.

Figure 3:
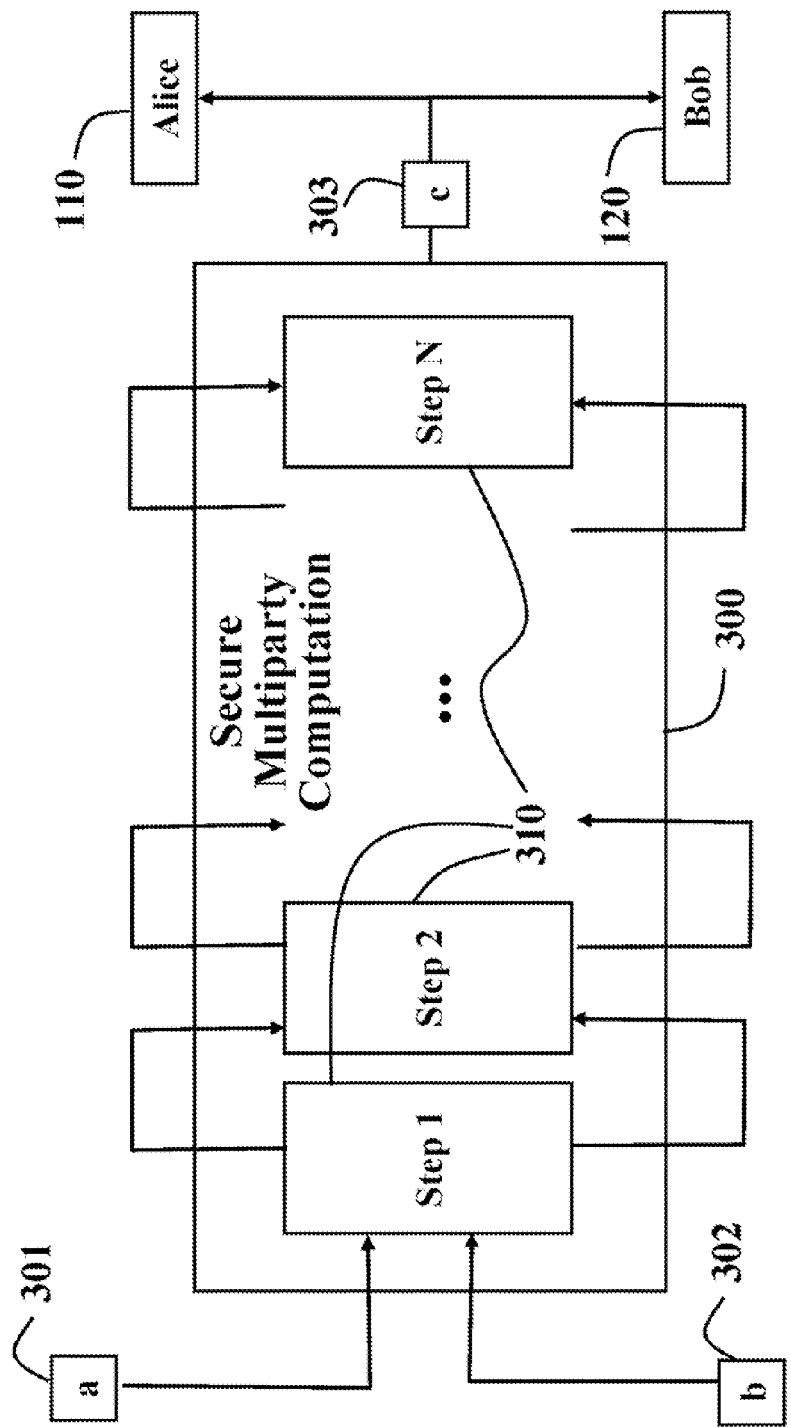
FIG. 3 is a block diagram of a secure multi-party computation used to implement speech recognition according to an embodiment of the invention.

The speech recognition according to the embodiments of our invention is implemented using a secure multi-party computation 300 as shown in FIG. 3. The method takes in private inputs a 301 and b 302. The method is split into steps 1-N 310. Each, step is implemented as secure primitive protocol. Intermediate results are distributed as random additive shares and feed to the following steps. The final result c 303 is obtained by Alice 110 and Bob 120, or another designated party.

We implement each step of the method securely because if one of the steps is insecurely implemented, then either party could utilize the information to work their way backwards to gain knowledge about the other's private data. In addition, we also consider the results of intermediate steps. If such results of intermediate steps are available, then there is a possibility that one could also get back to the private data.

To prevent this, we express every step of the method in terms of a handful of basic secure protocols, henceforth called primitives, for which secure implementations are provided. We distribute intermediate results randomly between the two parties, such that neither party has access to the entire result. For example, instead of obtaining the result z of a certain step, the parties obtain random additive shares $z_1$ and $z_2$ ($z_1+z_2=z$).

Secure protocols can be categorized as cryptographic protocols and algebraic protocols, as described above. They provide different: levels of security and efficiency. Most of the algebraic protocols leak some information but are more straightforward and efficient than their cryptographic counterparts. We use cryptographic protocols as they tend to be more secure. Below, we provide a description of the protocols we use.

Secure protocols are often analyzed for correctness, security and complexity. Correctness is measured by comparing the proposed protocol with the ideal protocol using a third party. If the results are indistinguishable, the protocol is correct. Note that we can use a secure approximation to an ideal method. All the protocols we present are exact protocols. For security, one needs to show what can and cannot be learned from the data, exchange. For complexity, one shows the computational and communication complexity of the secure method.

Based on the choice of primitive protocols used and how they are implemented, one can achieve different levels of security and computational/communication efficiency.

Secure Protocols

Below, we describe the primitive protocols that we use and their implementations, namely SIP, SMAX, SVAL, SLOG and GML.

Secure Inner Products Protocol (SIP)

One primitive protocol determines a secure inner product. If Alice has a vector x and Bob has a vector y, a secure inner product protocol produces two numbers a and b such that $a+b=x^Ty$, where T is the transpose operator. Alice obtains the result a, and Bob obtains the result b. To simplify notation, we denote a. secure inner product: computation $x^Ty$ as SIP(x, y).

Secure Maximum Index Protocol (SMAX)

Alice has the vector $x=[x_1 \ldots x_d]$, and Bob has the vector $y=[y_1 \ldots y_d]$. They would like to determine an index of a maximum of $x+y=[(x_1+y_1) \ldots (x_d+y_d)]$. For example, the element is a likelihood. At the end of the protocol, Alice (and/or Bob) receives the result but neither party knows the actual value of the maximum. Notice that the same protocol can be used to determine the index of the minimum.

This protocol is j=SMAX(x, y). For this primitive, we use the permute protocol, see below. The protocol enables Alice and Bob to obtain additive shares, q and s, of a random permutation of the vector x+ y, π(x+y), where the random permutation π is selected by Alice, and Bob has no knowledge of the permutation π.

Alice sends q–r to Bob, where r is a random number selected by her. Bob sends back the index of the maximum element of q+s–r to Alice. Then, Alice determines the real index using the inverse of the permutation π. Neither party learns the value of the maximum element, and Bob does not learn the index of the maximum element. If the security requirements of Alice are more strict, she can encrypt elements of q using a homomorphic encryption scheme and send them to Bob along with the public key.

Bob can make comparisons among the encrypted values of π(x+y) using Yao's millionaire problem protocol, and send back the index of the maximum element, e.g., see I. F. Blake and V. Kolesnikov, "Strong conditional oblivious transfer and determining on intervals," Proceedings of Advances in Cryptology—ASIACRYPT'04, ser. LNCS, P. J. Lee, Ed., vol. 3329. Springer-Verlag, 2004, pp. 515-529, and H. -Y. Lin and W. -G. Tzeng, "An efficient solution to the millionaires' problem based on homomorphic encryption," in Proc of Intl. Conf. on Applied Cryptography and Network Security, ser. LNCS, vol. 3531. Springer-Verlag, 2005, pp. 456-466, both incorporated herein by reference.

Secure Maximum Value Protocol (SVAL)

Alice has the vector x, and Bob has the vector y. They would like to determine the value of the maximum element in z=x+y. Again, as described above, the element can be a likelihood. After the protocol, Alice and Bob receive additive shares of the result, a and b, but neither party knows the index of the maximum element. Notice that the same protocol can be used to determine the value of the minimum. We denote this as a+b=SVAL(x, y). For this protocol, we can use a protocol based on the one described by M. J. Atallah, F. Kerschbaum, and W. Du, "Secure and private sequence comparisons," in Proceedings of Workshop on Privacy in the Electronic Society, Washington, D.C., USA. Oct. 2003, incorporated herein by reference.

We first describe a naive approach. Notice that $z_i \geq z_j \Leftrightarrow (x_i - x_j) \geq (y_j - y_i)$. Alice and Bob can do such pairwise comparisons and apply any conventional maximum finding method to learn the value of the maximum. To perform the comparisons securely, they can use Yao's millionaire problem protocol.

However, if Alice and Bob follow the above naive approach, then both parties are also able to find the index of the maximum. Hence, Alice and Bob obtain two vectors whose sum is a random permutation of z. Neither Alice nor Bob know the permutation. They can then follow the above naive approach on their newly obtained vectors to determine additive shares of the maximum element. The permute protocol is described in M. J. Atallah, F. Kerschbaum, and W. Du, "Secure and private sequence comparisons," in Proceedings of Workshop on Privacy in the Electronic Society, Washington, D.C., USA, October 2003, incorporated herein by reference.

Secure Logsum Protocol (SLOG)

Figure 4:
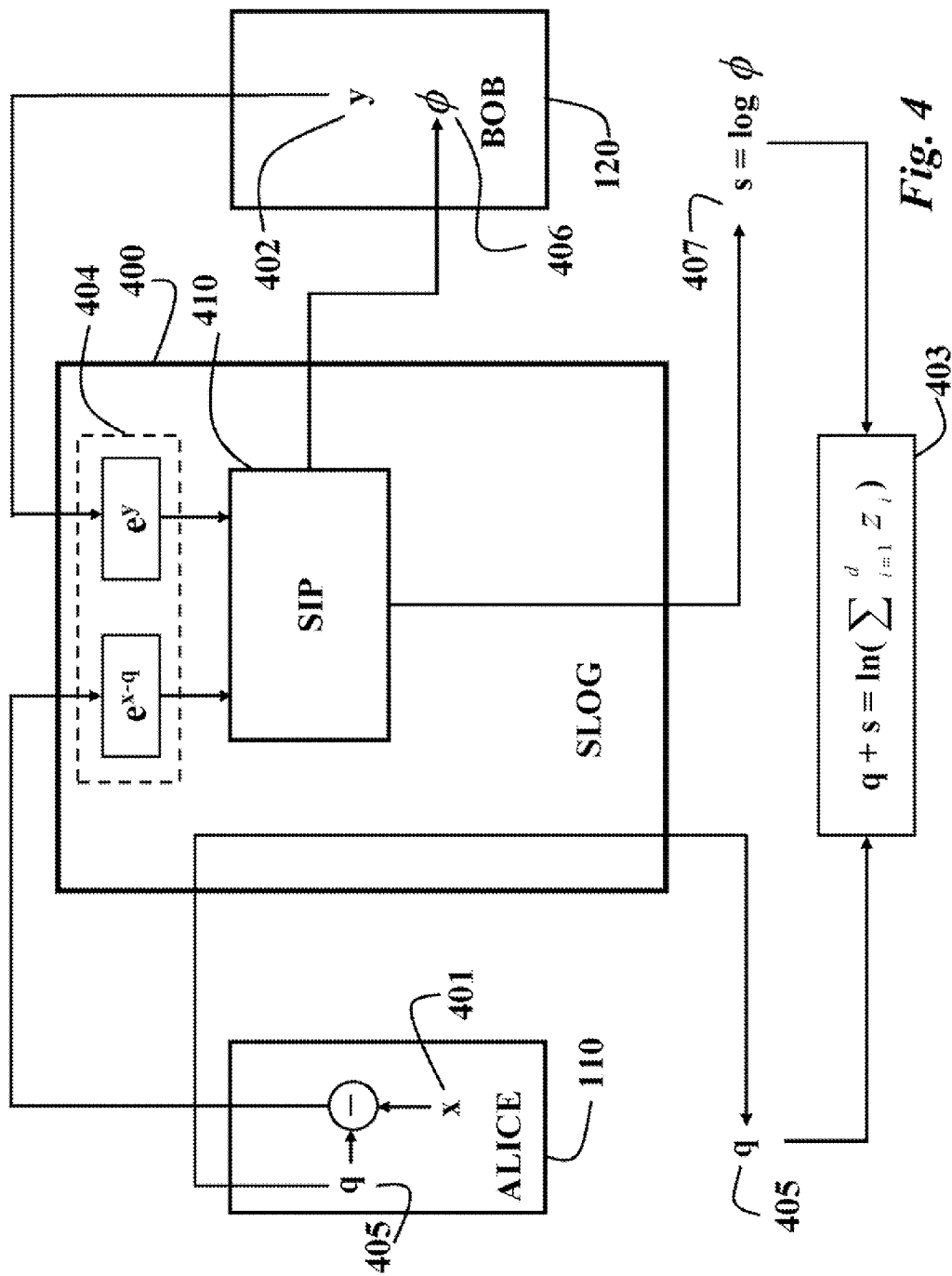
FIG. 4 is a block diagram of a secure logarithmic sum according to an embodiment of the invention.

FIG. 4 shows the steps for logarithmic sum (logsum) primitive protocol 400. Unlike the other protocols described above, the logsum protocol is not a cryptographic primitive. We use the logsum primitive to simplify the implementation of many of the other protocols describe herein.

Alice 110 has the vector x 401, and Bob has the vector y 402, such that $$x+y-\ln z=[\ln z_1 \ldots \ln z_d].$$

They would like to determine additive shares q 405 and s 407 such that q+s=ln $$\left(\sum_{i=1}^{d} z_i\right) 403.$$

We denote this secure protocol as q+s=SLOG(x, y). One can determine the logarithm of a sum from the logarithms of individual terms 404 as follows:

$$\ln\left(\sum_{i=1}^{d} z_i\right) = \ln\left(\sum_{i=1}^{d} e^{x_i+y_i}\right). \qquad (4)$$

This leads to the following protocol.

Alice and Bob determine the dot product between vectors $e^{x-q}$ and $e^y$ using SIP($e^{x-q}$, $e^{-y}$) 410, where q 405 is a random number selected by Alice, Bob obtains φ 406, which is the result of the secure inner dot product.

Notice that Bob has s 407 such that $$s = \ln\phi = -q + \ln\left(\sum_{i=1}^{d} e^{x_j+y_j}\right),$$

and Alice has q 405.

Bob receives the entire result of the dot product. However, this does not reveal any information to Bob about the vector x 401 due to the presence of the random number q 405. In no other step does either party receive the complete result of an operation. Thus, the protocol is secure. In terms of efficiency, this primitive is equivalent to using the SIP primitive 410 once.

Gaussian Mixture likelihood Protocol (GML)

Figure 5:
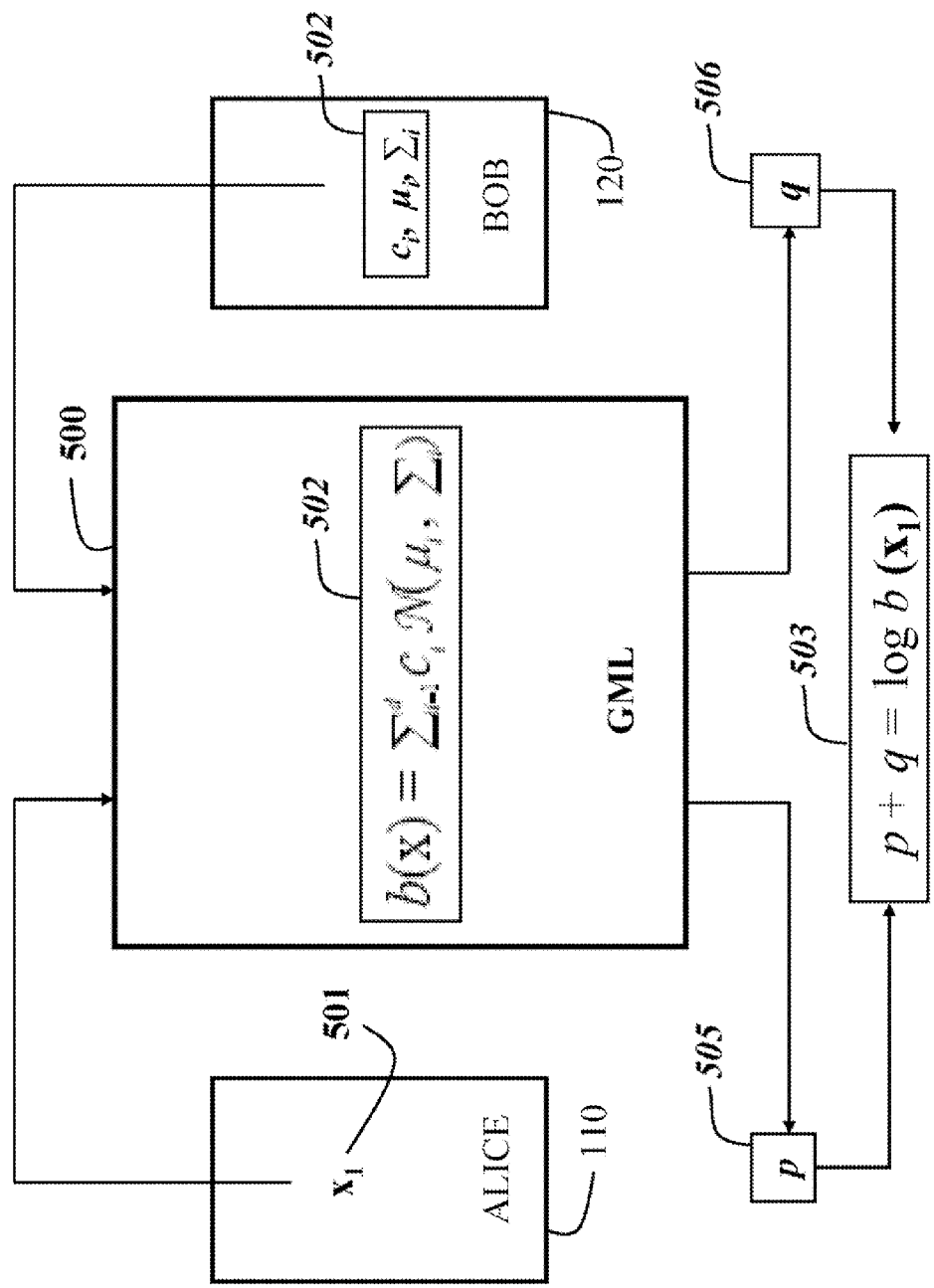
FIG. 5 is a block diagram, of secure evaluation of the likelihood of a given data vector from a Gaussian mixture distribution according to an embodiment: of the invention.

As shown in FIG. 5, a secure classification with Gaussian mixture models can be used to determine the likelihoods. Such as method is described in detail in U.S. patent application Ser. No. 11/219,452 filed on Sep. 2, 2005, "Secure Classifying of Data with Gaussian Distributions," Smaragdis et al., and Shashanka et al, "Secure sound classification: Gaussian mixture models," Acoustics, Speech and Signal Processing, 2006, ICASSP 2006 Proceedings, 2006 IEEE International Conference, Volume: 3, pp. 1088-1091 Proc, May 2006, both incorporated herein by reference.

Alice 110 has an observation sequence, i.e., a vector x 501. The observation symbol probability distribution is determined by a mixture of Gaussian distributions b(x) 502, where variable, $c_i$ is the mixture coefficient, . (.) is a Gaussian distribution with a mean vector $\mu_i$, and a covariance matrix $\Sigma_i$, all held by Bob 120. The result 503 is p+q=log b ($x_1$), where Alice obtains p 505, and Bob obtains q 506. Additional details are described in the above referenced U.S. patent application by Smaragdis et al.

Generic Protocols

For all three HMM design problems described above, all equations for HMM design can be written as a series of steps 310 as shown in FIG. 3. Each step can be: (a) finding likelihoods from a. Gaussian mixture model, which can be accomplished securely using the secure GML protocol 500, (b), determining the index of the maximum element of the sum of two vectors, which can be accomplished using SMAX 601, (c) determining the maximum element from the sum of two vectors, which can be accomplished using SVAL 602, or (d) determining logsums, which can be accomplished using SLOG 400.

Figure 6:
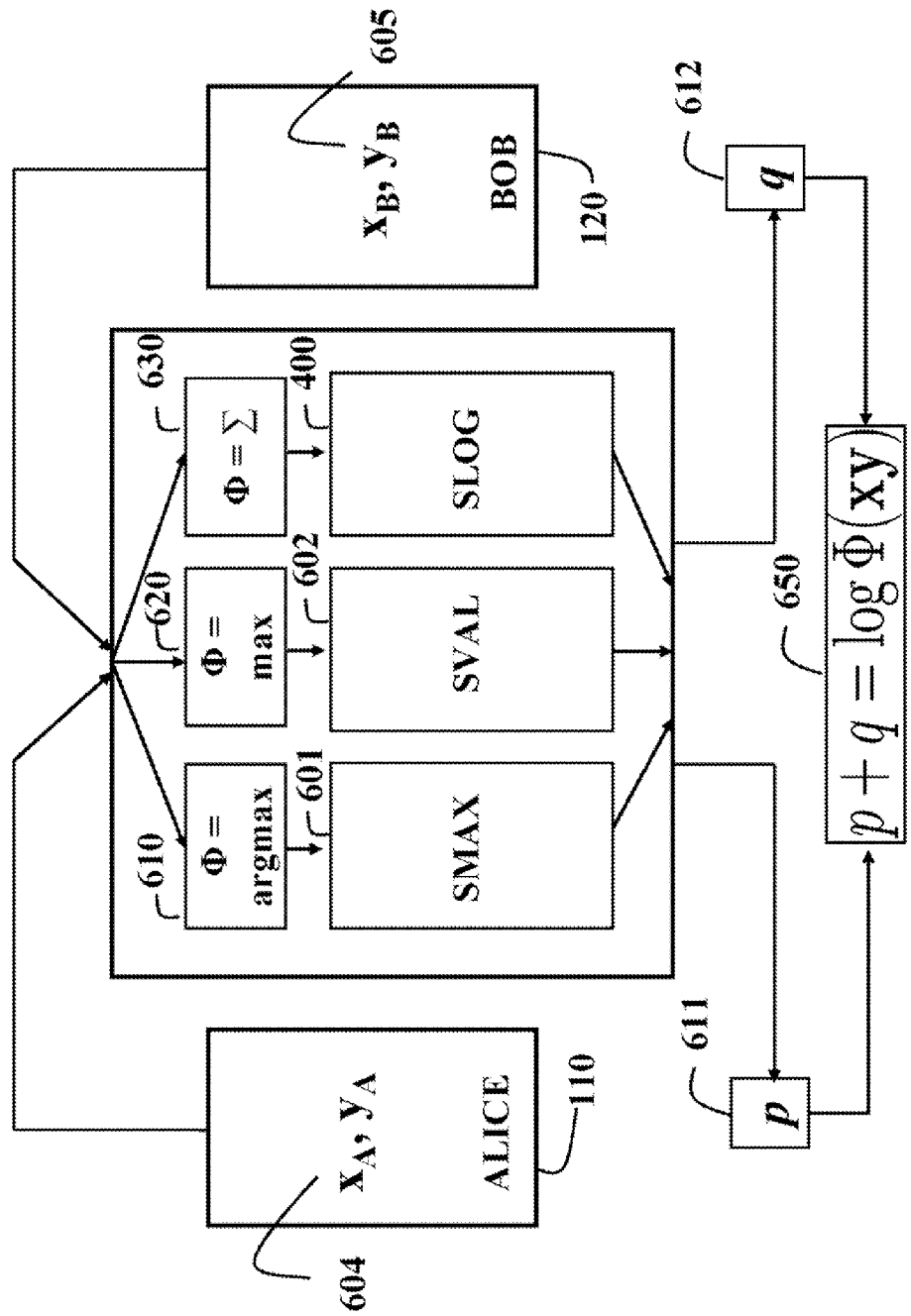
FIG. 6 is a block diagram of secure protocol for summation, maximum likelihood element, and the argument of the maximum element, given additive shares of logarithms of combining vectors according to embodiments of the invention.

FIG. 6 show's a generic module that determines a function $\Phi$ of two vectors x and y. Alice 110 has additive shares $x_A$, $y_A$ 604, and Bob 120 has additive shares $x_B$, $y_B$ 605 of log x and log y, respectively, i.e., $$x_A+x_B=\log x, \text{ and } y_A+y_B=\log y,$$

If the function is $\Phi(xy)$=argmax $x_i y_i$ 610, then the module calls the primitive 601 SMAX to produce an index to the maximum element. If the function is $\Phi(xy)$=max $x_i y_i$ 620, then the module calls the primitive SVAL 602 to produce the value of the maximum element. If the function is $\Phi(xy)$=$\Sigma x_i y_i$ 630, then the module calls the primitive SLOG 400 to produce the logarithmic sum of two elements.

Alice and Bob obtain additive results p 611, and q 612, respectively, such that $$p+q=\log \Phi(xy)\ 650.$$

The functions used in this generic protocol module can be used to train a Gaussian mixture model from data using an EM protocol to train the HMM parameters from training speech data. The EM protocol is described in detail below. Secure training is performed by Bob using data provided by Alice following the SMAX. SVAL or SLOG primitives in a right order with appropriate inputs as described in the equations below.

Evaluating HMMs

Figure 7:
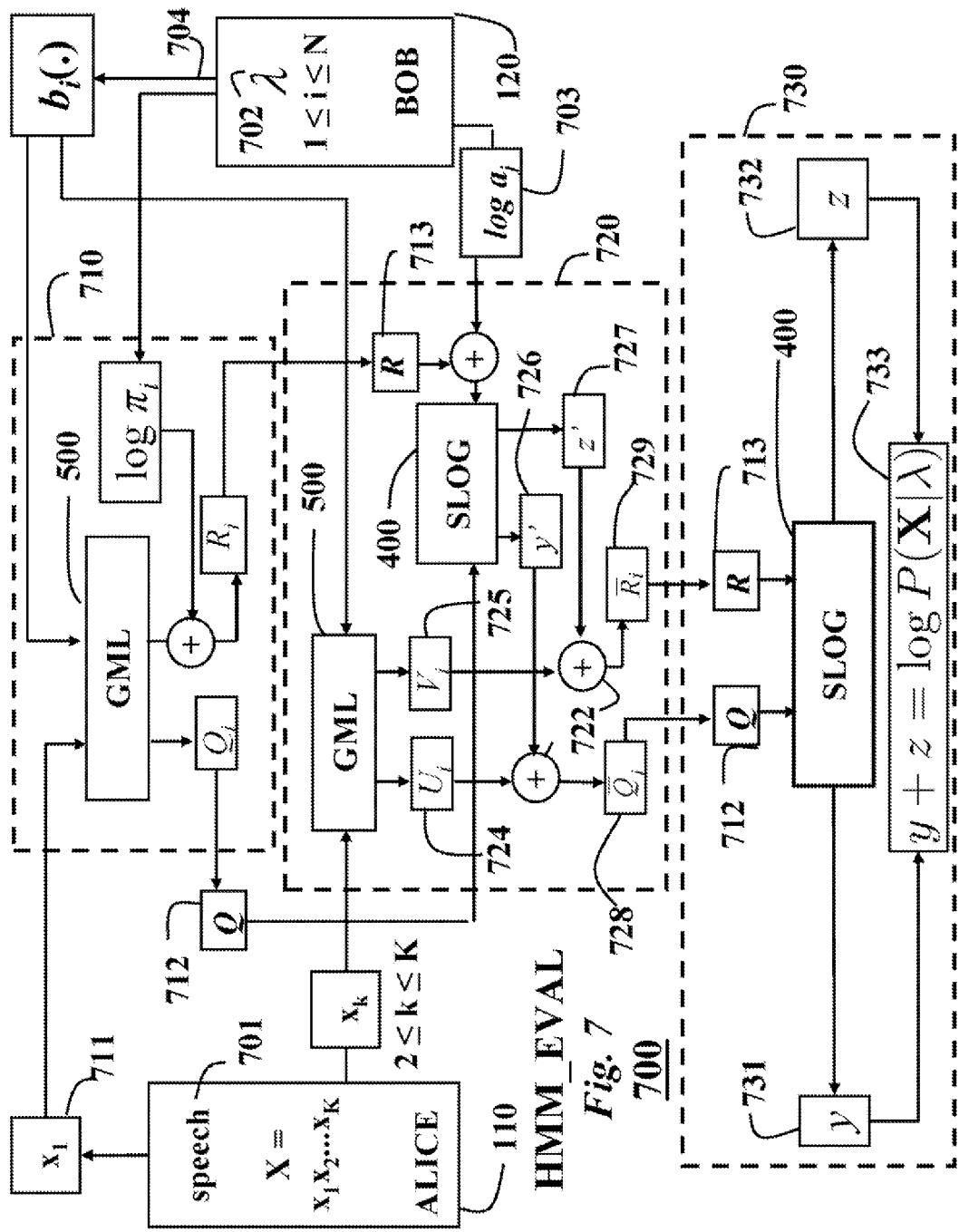
FIG. 7 is a block diagram of secure determination of a likelihood of a speech unit from a HMM according to an embodiment of the invention.

FIG. 7 shows the secure protocol (HMM_EVAL) 700 for recognizing speech. The protocol determines the likelihood of a speech units X=$x_1 x_2 \ldots x_K$ 701, supplied by Alice 110, with respect to a HMM with parameters $\lambda$ 702, supplied by Bob 120, and for the determination of the forward variable $\alpha$. There are three major steps in the process as shown in FIG. 7.

Step 1—Initialization 710.

For every state i 704 of the HMM 200, the forward variable a is determined for the first vector $x_1$ 711 using the GML protocol 500, Alice and Bob obtain additive shares Q 712 and R 713 such that $$Q_i+R_i=\log b_i(x_1)+\ln \pi_i=\log \alpha_1(i)\ 703.$$

Step 2—Induction 720

For every state i of the HMM, the forward variable a is determined for vector $x_k$ 721, for k={2, ..., K} using GML 500 and SLOG 400. GML 500 produces $U_i$ 724, and $V_i$ 725, which are summed 722, respectively, with y' 726 and z' 727 to produce $\overline{Q}_i$ 728 and $\overline{R}_i$ 729. Finally, Alice and Bob obtain additive share vectors Q 712 and R 713 such, that $Q_i+R_i$=log $\alpha_K(i)$.

Step 3—Termination 730

Alice and Bob perform SLOG 400 in the final step 730 to obtain y 731 and z 732, respectively, such that y+z=ln P(X|$\lambda$) 732.

Secure computation of a backward variable $\beta$ can be done in a similar way, as described in detail below.

Determination Best Sequence of Model States (Viterbi Protocol)

Figure 9:
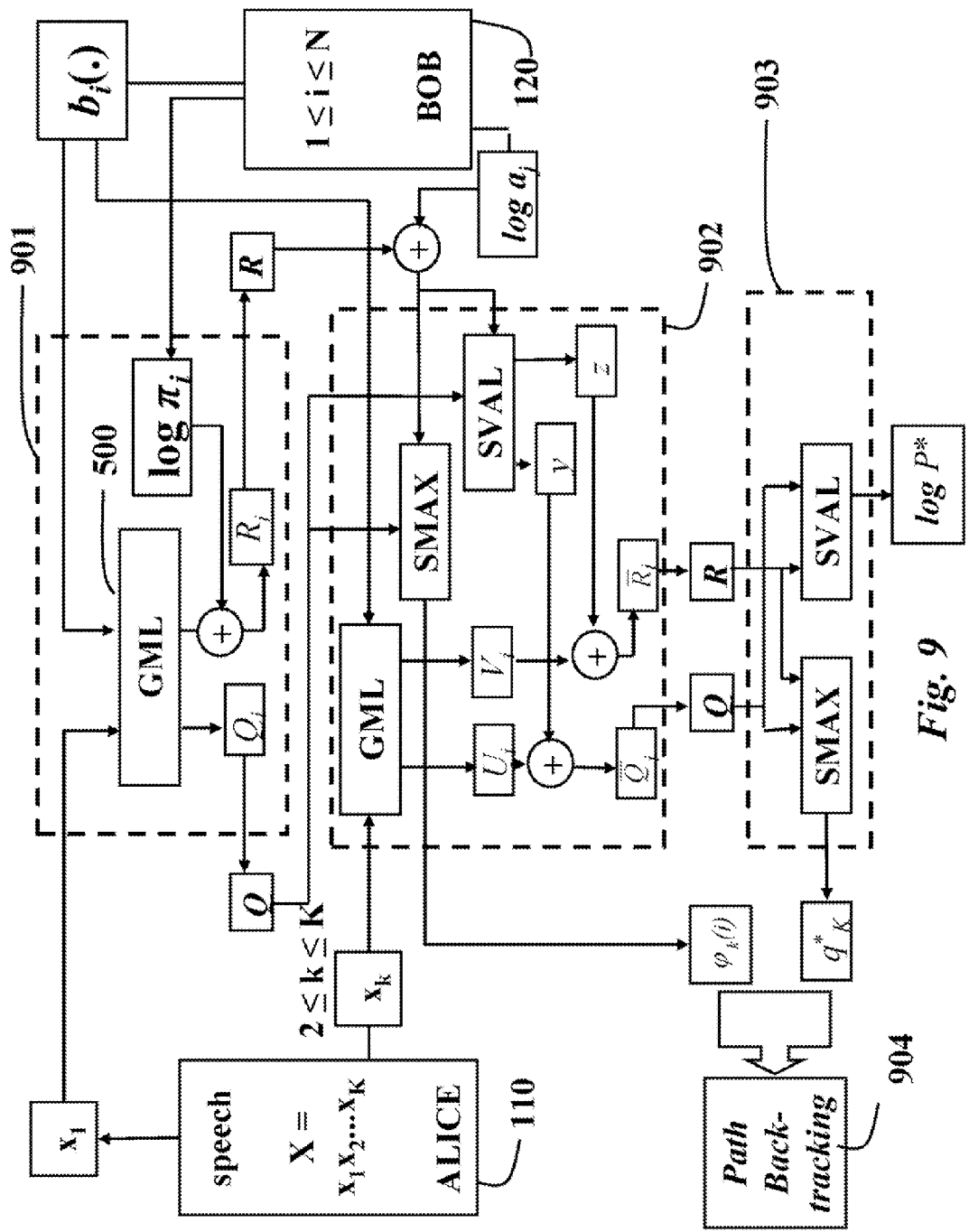
FIG. 9 is a block diagram of steps for determining a best sequence of model states according to an embodiment of the invention.

FIG. 9 is a block diagram of steps for determining a best sequence of model states. This protocol can be used to update the trained HMMS, i.e., to reestimate the model parameters. Alice has speech X and Bob has a trained HMM with parameters $\lambda$, as described above. Alice wants to find the best sequence of model states $q^*_T$. There are three steps:

Step 1—Initialization 901

A Viterbi score for the first speech vector is determined using GML 500 as described above. At the end of this step, Alice and Bob have Q and R such that $Q_i+R_i$=log $\delta_1(i)$.

Step 2—Recursion 902

Alice and Bob obtain vectors Q and R such that $Q_i+R_i$=log $\delta_K(i)$. Alice obtains $\phi_k(i)$, for k={2, ..., K} and i={1, ... N}.

Step 3—Termination 902

Alice and Bob perform SVAL on their additive shares to obtain log P*. They engage in SMAX on their shares, and Alice obtains $q^*_K$ In the final step, Alice backtracks to obtain the sequence of model states.

Final Step—Speech Recognition

After Alice and Bob have additive shares of the likelihood of Alice's speech for every HMM unit in Bob's vocabulary, recognition of Alice's speech unit is possible. This is analogous to assigning a class label to the speech, vector when all the class likelihoods are known. In this case, all HMM likelihoods are known and the speech corresponds to that word or speech unit for which the likelihood is the highest.

FIG. 7 describes how to evaluate the likelihood of speech data for a given HMM.

Figure 8:
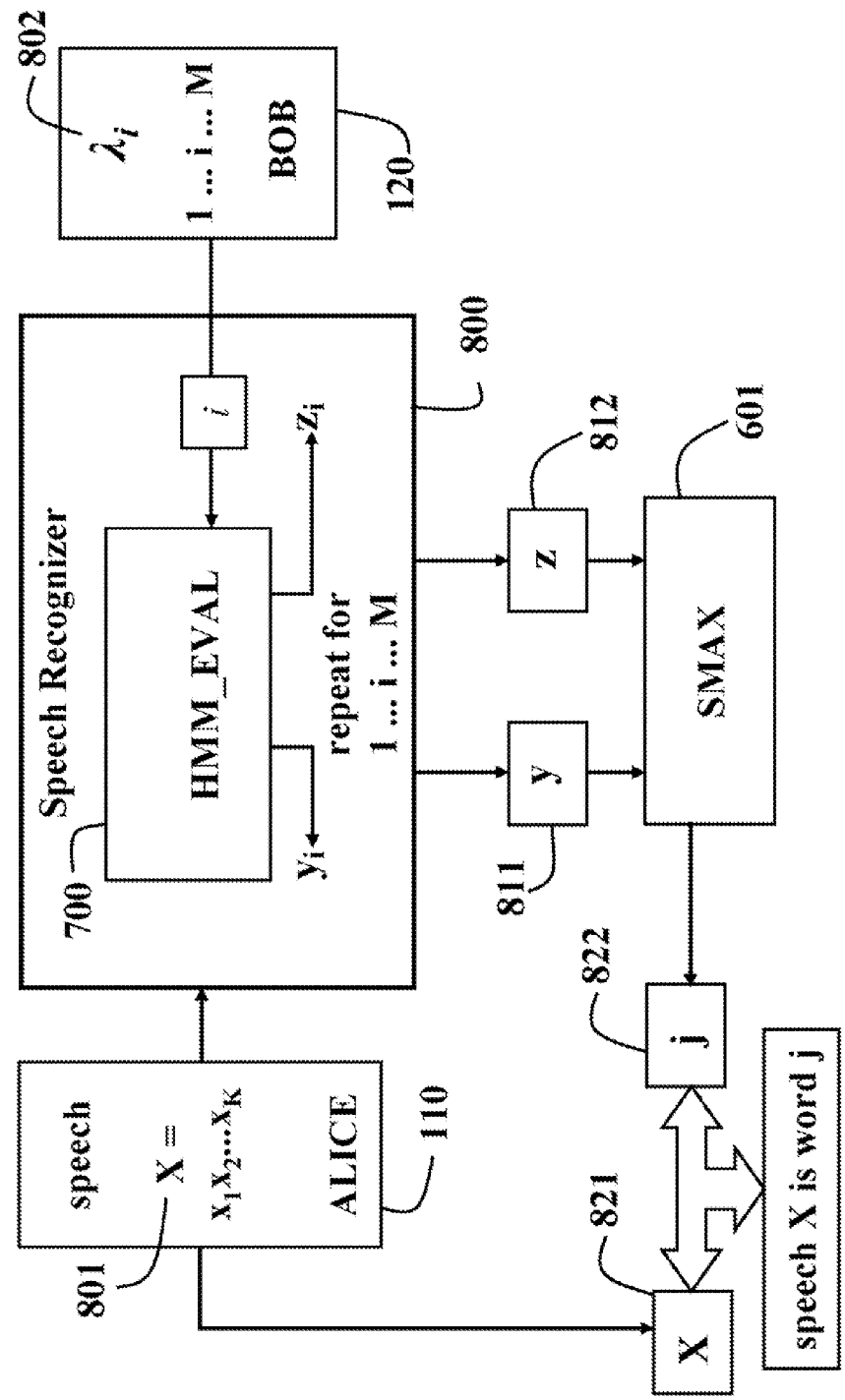
FIG. 8 is a block diagram of a secure speech recognizer according to an embodiment of the invention.

FIG. 8 shows block diagram for the final step where a label is assigned to the speech vector 801 X 801 of Alice. 120 Bob has trained parameters $\lambda_i$ 802 for the HMM 200 corresponding to the $i^{th}$ speech unit in the vocabulary, $i=\{1, \ldots, M\}$.

The 800 speech recognizer includes the HMM_EVAL module 700, which was described for FIG. 7 above. For HMMs corresponding to every word i in the vocabulary, the likelihood of X is securely evaluated, and Alice and Bob obtain additive shares of the likelihood $y_i$ and $z_i$, respectively. The resulting vectors 811 y and 812 z are used as inputs to SMAX protocol 601 and Alice obtains the result j. This implies that speech X 821 corresponds to the word j 822.

Secure Classification: Gaussian Mixture Models

Alice has a d-component speech vector x, and Bob has the HMMs with the multivariate Gaussian distributions of N classes $\omega_i$, for $i=\{1, \ldots, N\}$, that could correspond to the vector x. They engage in a protocol that lets Bob classify Alice's data but neither party wants to disclose data to the other party. We describe protocols, which enable such computations.

The idea, is to evaluate the value of a discriminant function $$g_i(x) = \ln p(x|\omega_i) + \ln P(\omega_i) \tag{5}$$

for all classes $\omega_i$, and assign x to class if $\omega_i$ if $g_i(x) > g_j(x)$ for all $j \neq i$. Here, $p(x|\omega_i)$ is the class-conditional probability density function, and $P(\omega_i)$ is the a priori probability of the class.

We describe two cases where:
each class is modeled as a single multivariate Gaussian distribution; and
each class is modeled as a mixture of multivariate Gaussian distributions.

Case 1: Single Multivariate Gaussian Distribution

The probability distribution of data, can be represented by a multivariate Gaussian distribution i.e., $p(x|\omega_1) \sim (\mu_i, \Sigma_i)$, where $\mu_i$ is the mean vector and $\Sigma_i$ is the covariance matrix of class $\omega_i$. Hence, the log-likelihood is given by:

$$\ln p(x \mid \omega_i) = -\frac{1}{2}(x-\mu_i)^t \sum_i^{-1}(x-\mu_i) - \frac{d}{2}\ln 2\pi - \frac{1}{2}\ln |\sum_i| \tag{6}$$

Ignoring the constant: term $(d/2) \ln \pi$, we can write Equation (5) as:

$$g_i(x) = -\frac{1}{2}(x-\mu_i)^t \sum_i^{-1}(x-\mu_i) - \frac{1}{2}\ln|\sum_i| + \ln P(\omega_i) \tag{7}$$

Simplifying, we have:

$$g_i(x) = x^T \overline{W}_i x + \overline{w}_i^T x + \omega_{i0}, \tag{8}$$

where $$\overline{W}_i = -\frac{1}{2}\sum_i^{-1}, \quad \overline{w}_i = \sum_i^{-1} \mu_i, \text{ and}$$

$$\omega_{i0} = -\frac{1}{2}\mu_i^T \sum_i^{-1} \mu_i - \frac{1}{2}\ln|\sum_i| + \ln P(\omega_i) \tag{9}$$

We generate the (d+1)-dimensional vectors $\overline{x}$ and $w_i$ by appending the value 1 to x, and appending $w_{i0}$ to $\overline{w}_i$. By changing $\overline{W}_i$ into a (d 1)×(d 1) matrix $W_i$, where the first d components of the last row are zeros, and the last column is equal to $w^T_i$, we can express Equation (8) in a simplified form:

$$g_i(x) = \overline{x}^T W_i \overline{x},$$

Expressing $\overline{x}$ as x for simplicity, we can write the above Equation as:

$$g_i(x) = x^T W_i x \tag{10}$$

Henceforth, we use x to denote a (d 1)-dimensional vector with the last component equal to 1, unless otherwise stated.

Single Multivariate Gaussian Protocol (SMG)

Input: Alice has vector x, Bob has a matrix $W_i$ for $i=1, \ldots, N$. We express the matrix $W_i$ as $[W^1_i W^2_i \ldots W^{d+1}_i]$, where the vector $W^j_i$ is the $j^{th}$ column of $W_i$.

Output: Alice learns l such that $g_l(x) > g_j(x)$ for all $j \neq l$. Bob learns nothing about x.

For $i=1, 2, \ldots, N$

For $j=1, \ldots, d+1$, Alice and Bob perform SIP(x, $W^j_i$) to obtain the vectors $a_i = [a^1_i \ldots a^{d+1}_i]$ and $b_i = [b^1_i \ldots b^{d+1}_i]$, respectively. Alice then determines $a_i x$.

Alice and Bob perform SIP($b_i$, x) to obtain $q_i$ and $r_i$ respectively.

Alice has vector $A = [(a_1 x + q^1) \ldots (a_N x + q_N)]$, and Bob has vector $B = [r_1 \ldots r_N]$.

Alice and Bob perform the secure maximum index protocol between the vectors A and B, and Alice obtains l=SMAX(A, B).

Case 2: Mixture of Multivariate Gaussian Distributions

We now describe the case where the state transition probability distribution of each class is modeled as a mixture of Gaussian distributions. The mean vector and covariance matrix of the $j^{th}$ Gaussian in class $\omega_i$ are respectively $\mu_{ij}$ and $\Sigma_{ij}$. Hence, we have $$p(x \mid \omega_i) = \sum_{i=1}^{J_i} \alpha_{ij} N\left(\mu_{ij}, \sum_{ij}\right)$$

where $J_i$ is the number of Gaussian distributions describing class $\omega_1$, and $a_{ij}$ are the mixture coefficients. The log likelihood for the $j^{th}$ Gaussian distribution in the $i^{th}$ class is given by:

$$l_{ij}(x) = x^T \overline{W}_{ij} x + \overline{w}_{ij}^T x + \omega_{ij}, \tag{11}$$

where $$\overline{W}_{ij} = -\frac{1}{2}\sum_{ij}^{-1}, \quad \overline{w}_{ij} = \sum_{ij}^{-1} \mu_{ij},$$

and $$\omega_{ij} = -\frac{1}{2}\mu_{ij}^T \sum_{ij}^{-1} \mu_{ij} - \frac{1}{2}\ln|\sum_{ij}| + \ln \alpha_{ij}.$$

As above, we can simplify Equation (11) as:

$$l_{ij}(x) = x^T W_{ij} x \tag{12}$$

Hence, the discriminant function for the $i^{th}$ class can be written as $$g_i(x) = \text{logsum}(l_{i1}(x), \ldots, l_{iJ_i}(x)) + \ln P(\omega_i) \quad (13)$$

$$= \ln\left(\sum_{j=1}^{J_i} e^{l_{ij}(x)}\right) + \ln P(\omega_i)$$

Mixture of Gaussian Protocol (MoG)

Input: Alice has the vector x, Bob has the matrix $W_{ij}$, and mixture weights $P(w_i)$ for $1, 2, \ldots, N$, and $j=1, 2, \ldots, J_i$.

Output: Alice learns l such that $g_l(x) > g_j(x)$, for all $j \neq l$. Bob learns nothing about x.

For $i=1, 2, \ldots, N$

Alice and Bob engage in steps 1 and 2 of Protocol SMG for the $J_i$ Gaussian distributions in the $i^{th}$ mixture to obtain vectors $A_i = [A_{i1} \ldots A_{iJi}]$ and $B_i = [B_{i1} \ldots B_{iJi}]$. Notice that $A_{ij} + B_{ij} = l_{ij}(x)$.

Alice and Bob engage in the secure logsum protocol with vectors $A_i$ and $B_i$ to obtain and $u_i$ and $z_i$, i.e., $u_i + z_i = \text{SLOG}(A_i, B_i)$.

Bob determines the vector $v = [v_1 \ldots v_N]$, where $v_i = z_i + \ln P(w_i)$. Alice forms the vector $u = [u_1 \ldots u_N]$.

Alice and Bob perform the secure maximum index protocol between vectors u and v and Alice obtains $l = \text{SMAX}(u, v)$.

Training Gaussian Mixtures from Data

We now describe a related problem. Alice has K d-component speech vectors $x_1, x_2, \ldots, x_K$. Alice wants to train a mixture of c Gaussian distributions with the data. She can use an iterative expectation-maximization (EM) method to estimate the parameters of the c Gaussian distributions, and their mixture weights.

Now, consider the case when Bob wants to learn the parameters but Alice does not want to disclose her speech to Bob. One solution is for Alice to estimate the parameters herself and then give the parameters to Bob. Another approach is for Alice and Bob to engage in a secure protocol, which lets Bob learn the parameters, while Alice's data remain private. The latter approach becomes necessary in a case where Bob wants to do data mining on combined data from private data bases owned by Alice and Charlie. Below, we describe a secure protocol, which lets two parties perform such computations.

Expectation-Maximization Protocol (EM)

The estimate of a particular parameter after the $r^{th}$ iteration is denoted by a superscript. Thus, $\mu^r_i$, $$\sum_i^r$$

and, $P^r(w_i)$ denote the mean vector, covariance matrix and the mixture weight for the $i^{th}$ Gaussian distribution after the $r^{th}$ iteration, respectively. For convenience, we denote the entire parameter set after the $r^{th}$ iteration by $\lambda^r$. At any given iteration, Alice has access to her data and Bob has access to the parameter $$\sum_i^r.$$

Alice and Bob have additive shares $\mu^r_{iA}$, $\mu^r_{iB}$ and $l_{iA}$, $l_{iB}$ such that $\mu^r_{iA} + \mu^r_{iB} = \mu^r_i$ and $l_{iA} + l_{iB} = \ln P^r(w_i)$. We can write the steps of the EM method as follows:

Estimation Step:

$$P(\omega_i | x_k, \lambda^r) = \frac{p\left(x_k | \omega_i, \mu^r_i, \sum_i^r\right) P^r(\omega_i)}{\sum_{j=1}^{c} p\left(x_k | \omega_j, \mu^r_j, \sum_j^r\right) P^r(\omega_j)} \quad (14)$$

Input: Alice has $x_k$, $\mu^r_{iA}$ and $l_{iA}$, and Bob has $\mu^r_{iB}$, $$\sum_i^r.$$

and $l_{iB}$, $i=1, 2, \ldots, c$.

Output: Alice and Bob obtain $u_{ik}$ and $v_{ik}$ such that $u_{ik} + v_{ik} = \ln P(w_i | x_k, \lambda_r)$.

Bob forms matrices $W_i$ for $i=1, \ldots, c$ as described above, and Equation (9), using ($d=2$) $\ln 2\pi$, instead of $\ln P(w_i)$ to determine $w_{i0}$). With $(x_k - \mu^r_{iA})$ as Alice's input, and $W_i$ for $i=1, \ldots, c$ as Bob's input, and $N=c$, Alice and Bob engage in steps 1 and 2 of Protocol SMG to obtain vectors $A'_k$ and $B'_k$. The log-likelihood is given by Equation 6.

Alice and Bob obtain vectors $A_k$ and $B_k$, where for each i, $A_{ik} = A'_{ik} + l_{iA}$ and $B_{ik} = B'_{ik} + l_{iB}$. Notice that $A_{ik} + B_{ik}$ is the logarithm of the numerator in Equation 14.

Alice and Bob engage in the secure logsum protocol with the vectors $A_k$ and $B_k$ to obtain $y_k$ and $z_k$, i.e., $y_k + z_k = \text{SLOG}(A_k, B_k)$. Notice that $y_k + z_k$ is the logarithm of the denominator of Equation 14.

Alice forms vector $u_k$, where $u_{ik} = (A_{ik} - y_k)$. Bob forms the vector $v_k$, where $v_{ik} = (B_{ik} - z_k)$, $u_{ik} + v_{ik} = \ln P(w_{ij} x_k; \lambda^r)$.

Maximization Step:

$$\mu^{r+1}_i = \frac{\sum_{k=1}^{K} P(\omega_i | x_k, \lambda^r) x_k}{\sum_{k=1}^{K} P(\omega_i | x_k, \lambda^r)} \quad (15)$$

$$P^{r+1}(\omega_i) = \frac{\sum_{k=1}^{K} P(\omega_i | x_k, \lambda^r)}{K}$$

$$\sum_i^{r+1} = \frac{\sum_{k=1}^{K} P(\omega_i | x_k, \lambda^r)(x_k - \mu^{r+1}_i)(x_k - \mu^{r+1}_i)^T}{\sum_{k=1}^{K} P(\omega_i | x_k, \lambda^r)}.$$

Input: Alice has $x_k$; $k=1, \ldots, K$. Alice and Bob have K-vectors E and F such that $E_k + F_k = \ln P(w_i \lambda^r)$.

Output: Alice obtains $\mu^{r+1}_{iA}$, $l_{iA}$; Bob obtains $\mu^{r+1}_{iB}$, $\Sigma^{r+1}_i$ and $l_{iB}$.

Alice and Bob engage in the secure logsum protocol with vectors E and F to obtain e and f, i.e., $e+f = \text{SLOG}(E, F)$.

Alice determines $l_{iA} = e - \ln K$, and Bob determines $l_{iB} = f$.

For $j=1; 2, \ldots, d$:

Let $h_j$ be the K-vector formed by the $j^{th}$ elements of $x_1, \ldots, x_K$. Alice and Bob engage in the secure logsum protocol with vectors E+ln $h_j$, and F to obtain e' and f, i.e., e'+f=SLOG(E+ln $h_j$, F). Alice and Bob obtain the $j^{th}$ elements of $\mu^{r+1}_{iA}$ and $u^{r+1}_{iB}$ respectively as a result of SIP(exp(e'-e), exp(f'-f)).

Consider the evaluation of $\sigma_{mn}$, the $mn^{th}$ element of the matrix $$\sum_{r+1 i}.$$

We first evaluate the $mn^{th}$ element of $(x_k-\mu^{r+1}_i)(\overline{x}_k-\mu^{r+1}_i)^T$. For k=1, ..., K, Alice and Bob engage in the secure inner product protocol with vectors $\exp(\gamma_k)[\overline{x}_{km}\overline{x}_{kn}, -\overline{x}_{km}, \overline{x}_{kn}, 1]$, and $[\overline{mu}_{in}, \overline{u}_{im}, \overline{u}_{im}\overline{u}_{in}]$, where $\gamma_k$ is a random scalar selected by Alice. Let Bob obtain the result $\phi_k$.

Alice forms the K-vector $\gamma=[\gamma_1, \ldots, \gamma_K]$, and Bob forms the vector $\phi=[\phi_1, \ldots, \phi_K]$. Alice and Bob engage in the secure logsum protocol with vectors (E-$\gamma$) and (F+ln $\phi$) to obtain $\overline{e}$ and $\overline{f}$. Alice sends ($\overline{e}$-e) to Bob so that he can determine $\sigma_{mn}$. At the end of all iterations, Alice sends her shares $\mu_{iA}$ and $l_{iA}$ to Bob so that he can determine the mean and the mixture weight $P(w_i)$.

Hidden Markov Models
Forward-Backward Protocol

The forward variable $\alpha_t(i)$ is defined as $$\alpha_t(i)=P(x_1x_2\ldots x_t, q_t=S_i|\lambda) \quad (16)$$

We can solve for $\alpha_t$ inductively and determine $P(X|\lambda)$ as follows:
Initialization:

$$\alpha_1(i)=\pi_i b_i(x_1), 1 \leq i \leq N$$

Input: Bob has the Gaussian mixture distribution that defines $b_i(x)$, and the initial state distribution $\pi=\{\pi_i\}$. lice has speech $x_1$.

Output: Alice and Bob obtain vectors Q and R such that $Q_i+R_i=\ln \alpha_1(i)$.

Bob forms the matrices $W_{ij}$ as described above. With matrices $W_{ij}$ and mixture weights $c_{jm}$ as Bob's inputs, and $x_1$ as Alice's input, they perform steps 1 and 2 of the protocol MoG protocol. Alice and Bob obtain vectors U and V. Notice that $U_i+V_i=\ln b_i(x_1)$.

Alice forms the vector Q=U. Bob forms vector R, where for each i, $R_i=V_i+\ln \pi_i$. Thus, $Q_i+R_i=\ln b_i(x_1)+\ln \pi_i=\ln \alpha_1(i)$.
Induction:

$$\alpha_{t+1}(j) = \left(\sum_{i=1}^{N} \alpha_t(i)a_{ij}\right)b_j(x_{t+1}),$$

where $$1 \leq t \leq T-1, 1 \leq j \leq N.$$

Input: Alice and Bob have vectors Q and R such that $Q_i+R_i=\ln \alpha_t(i)$. Alice and Bob have $U_j$ and $V_j$ such that $U_j+V_j=\ln b_j(x_{t+1})$. Bob has the vector $a_j=[a_{1j}, \ldots, a_{Nj}]$.

Output: Alice and Bob obtain $\overline{Q}$ and $\overline{R}$ such that $\overline{Q}+\overline{R}=\ln \alpha_{t+1}(j)$.

Alice and Bob engage in the secure logsum protocol with vectors Q and (R+ln $a_j$) to obtain y' and z' i.e., y'+z'=SLOG(Q, R+ln $a_j$).

Alice obtains $\overline{Q}$=y'+$U_j$, and Bob obtains $\overline{R}$=z'+$V_j$.

Termination:

$$P(X|\lambda) = \sum_{i=1}^{N} \alpha_T(i).$$

Input: Alice and Bob have vectors Q and R such that $Q_i+R_i=\ln \alpha_T(i)$.

Output: Alice and Bob obtain y and z such that y+z=ln $P(X|\lambda)$.

Alice and Bob engage in the secure logsum protocol with vectors Q and R to obtain y and z, i.e., y+z=SLOG(Q, R).

We can obtain a similar procedure for a backward variable $\beta_t(i)$ defined as $$\beta_t(i)=P(x_{t+1}x_{t+2}\ldots x_T|q_t=S_i,\lambda) \quad (17)$$

We can solve for $\beta_t(i)$ inductively as follows:
Initialization:

$$\beta_T(i)=1, 1 \leq i \leq N$$

Induction $$\beta_t(i) = \sum_{j=1}^{N} a_{ij}b_j(x_{t+1})\beta_{t+1}(j),$$

where $$t = T-1, T-2, \ldots, 1,$$

$$1 \leq j \leq N$$

Input: Alice and Bob have vectors Y and Z such that $Y_j+Z_j=\ln \beta_{t+1}(j)$. Alice and Bob have U and V such that $U_j+V_j=\ln b_j(x_{t+1})$. Bob has the vector $a'_i$.

Output: Alice and Bob obtain $\overline{Y}$ and $\overline{Z}$ such that $\overline{Y}+\overline{Z}=\ln \beta_t(i)$.

Alice and Bob engage in the secure logsum protocol with vectors Y+U and (Z+V+ln $a'_i$) to obtain $\overline{Y}$ and $\overline{Z}$, i.e., $\overline{Y}$ and $\overline{Z}$=SLOG(Y+U, Z+V+ln $a'_i$).

Secure Viterbi Algorithm Protocol

The Viterbi protocol of FIG. 9 can be formally described as follows.
Consider the quantity $$\delta_t(i) = \max_{q_1,q_2\cdots q_{t-1}} P[q_1q_2\ldots q_t = S_i, x_1x_2 \ldots x_t | \lambda] \quad (18)$$

where $\delta_t(i)$ is the best score (highest probability) along a single path, at time t, which accounts for the first t observations and ends in state $S_i$. The procedure for finding the best state sequence can be stated as follows:
Initialization:

$$\delta_1(i)=\pi_i b_i(x_1), \Psi_1(i)=0 \; 1 \leq i \leq N$$

The procedure evaluating $\delta_1(i)$ is analogous to the initialization step of the forward backward procedure. After this step, Alice and Bob have additive shares of ln $\delta_1(i)$.
Recursion:

$$\delta_t(j) = \left(\max_{1 \leq i \leq N}[\delta_{t-1}(i)a_{ij}]\right)b_j(x_t)$$

$$\psi_t(j) = \text{argmax}_{1 \leq i \leq N}[\delta_{t-1}(i)a_{ij}],$$

where $$2 \leq t \leq T, 1 \leq j \leq N.$$

Input: Alice and Bob have vectors Q and R such that $Q_t + R_i = \ln \delta_{t-1}(i)$. Alice and Bob have U and V such that $U + V = \ln b_j(x_t)$. Bob has the vector $a_j$.

Output: Alice and Bob obtain $\overline{Q}$ and $\overline{R}$ such that $\overline{Q} + \overline{R} = \ln \delta_t(j)$. Alice obtains $\phi_t(j)$.

Alice and Bob engage in the secure maximum value protocol with vectors Q and (R+ln $a_j$) to obtain y and z. They also perform SMAX on the same vectors and Alice obtains the result which is equal to $\phi_t(j)$.

Alice determines $\overline{Q} = y + U$ and Bob determines $\overline{R} = z + V$.

Termination:

$$P^* = \max_{1 \leq i \leq N}[\delta_T(i)] \quad q_T^* = \mathrm{argmax}_{1 \leq i \leq N} \delta_T(i).$$

Alice and Bob use SVAL on their additive shares of $\ln \delta_T(i)$ for all i to evaluate $\ln P^*$. Similarly, they engage in SMAX on their shares and Alice obtains the result $q_T^*$.

Path Backtracking:

$$q_t^* = \Psi_{t+1}(q_{t+1}^*) \quad t = T-1, T-2, \ldots, 1.$$

Alice, who has access to $q_t$ and $\phi_t$, can evaluate the path sequence. Notice that Bob could be made to obtain this result instead of Alice, if we let Bob learn the values of $\phi_t$ and $q_t$ in steps 2 and 3, instead of Alice.

HMM Training

In the above formulations, we assumed that Bob had already trained his HMMs, Alice has all the speech training data and Bob wants to train a HMM using her data. Below, we show how Bob can securely re-estimate parameters of his HMM. Consider the variables $$\gamma_t(i) = P(q_t = S_i \mid X, \lambda) = \frac{(\alpha_t(i)\beta_t(i))}{P(X \mid \lambda)}$$

$$\xi_t(i, j) = P(q_t = S_i, q_{t+1} = S_j \mid X, \lambda)$$

$$= \frac{(\alpha_t(i)a_{ij}b_j(x_{t+1})\beta_{t+1}(j))}{P(X \mid \lambda)}$$

We have described how Alice and Bob can obtain their additive shares. Using these shares, Alice and Bob can determine additive shares $e_t$, $g_t$ and $f_t$, $h_t$ such that $e_t + f_t = \ln \xi_t(i, j)$, and $g_t + h_t = \ln \gamma_t(i)$. Alice determines $g_t = Q_t + \overline{Y} - y$, and $e_t = Q_t + U_j + Y_j - y$. Bob determines $h_t = R_t + \overline{Z}$ and $f_t = R_t + \ln a_{ij} + V_j + Z_j - z$. The variables $\pi_i$ and $a_{ij}$ can then be re-estimated, as follows:

$$\pi_i = \gamma_1(i)$$

$$\overline{a}_{ij} = \frac{\sum_{t=1}^{T-1} \xi_t(i, j)}{\sum_{t=1}^{T-1} \gamma_t(i)}.$$

Input: Alice and Bob have (T−1)-vectors e and f such that $e_t + f_t = \ln \xi_t(i, j)$. They also have vectors g and h such that $g_t + h_t = \ln \gamma_t(i)$.

Output: Bob obtains $\ln \overline{a}_{ij}$.

Alice and Bob engage in the secure logsum protocol with vectors e and f to obtain $\overline{e}$ and $\overline{f}$. They also engage in the secure logsum protocol with vectors g and h to obtain $\overline{g}$ and $\overline{h}$ respectively.

Alice sends ($\overline{e} - \overline{f}$) to Bob. Bob determines ($\overline{e} - \overline{g}$) + ($\overline{f} - \overline{h}$) to obtain $\ln \overline{a}_{ij}$.

Notice that instead of Bob obtaining the final result, Alice and Bob can have additive shares of $\ln \overline{a}_{ij}$. The secure protocols for forward-backward and Viterbi algorithm are modified so that Alice and Bob have additive shares of the vector $\ln \overline{a}_{ij}$. As for the Gaussian mixture distributions $b_i(x)$, Bob can securely train the distributions from Alice's data as we have described above. Bob does not learn all the parameters in every iteration. He learns the mean vector for every component Gaussian distribution only after the last iteration. He does learn the covariance matrix in every iteration, but quantities used to determine the covariance matrix are additive shares which does not help him in inferring Alice's data. The example described above uses two parties but it can be generalized to the case where Bob learns from multiple parties. In that case, trained statistics are averaged and provide an additional layer of security for the data providers.

Additional Primitives Protocols

Secure Inner Product Protocol Using Homomorphic Encryption

The following protocol is based on homomorphic encryption, see Goethals et al. Let the triple (Ge, En, De) denote a public-key homomorphic cryptosystem, i.e., probabilistic polynomial time methods for key-generation, encryption and decryption, The key generation method generates a valid pair (sk, pk) of private and public keys for a security parameter k.

The encryption method En takes as an input a plaintext m, a random value r and a public key pk, and outputs the corresponding ciphertext En(pk; m, r), The decryption method De takes as an input a ciphertext c and a private key sk, corresponding to the public key pk, and outputs a plaintext De(sk, c). It is required that De(sk; En(pk; m; r)) = m. A public-key cryptosystem is homomorphic if En(pk; $m_1$, $r_1$).En(pk; $m_2$, $r_2$) = En(pk; $m_1 + m_2$, $r_1 + r_2$), where '+' is a group operation, and '.' is a groupoid operation.

Inputs: Private vectors x and y by Bob and Alice respectively.

Outputs: Shares a and b such that $a + b = x^T y$.

Setup phase. Bob:

generates a private and public key pair (sk, pk).

sends pk to Alice.

For $i \in \{1, \ldots, d\}$, Bob:

generates a random new string $r_i$.

sends $c_i = \mathrm{En}(pk; x_i, r_i)$ to Alice.

Alice:

sets $$z \leftarrow \prod_{i=1}^{d} c_i^{y_i}.$$

generates a random plaintext b and a random nonce r'.

sends z' = z.En(pk; −b, r') to Bob.

Bob determines a = De(sk; z') = $x^T y$ − b.

Secure inner Product Protocol from Oblivious Polynomial Evaluation

The following protocol is based on Chang et al. Let Alice represent each $x_i$ as $$x_i = \sum_j a_{ij} 2^{j-1}$$

with $a_{ij} \in \{0, 1\}$. Let $v_{ij} = 2^{j-1} y_i$. The idea is to have Bob prepare $v_{ij}$ and have Alice obtain those $v_{ij}$ with $a_{ij} = 1$ in some secure way. This is achieved as follows. Bob prepares the pair ($r_{ij}$, $v_{ij}+r_{ij}$) for randomly selected $r_{ij}$ and Alice performs an independent oblivious transfer with Bob to obtain $r_{ij}$ if $a_{ij}=0$, and $v_{ij}+r_{ij}$ otherwise. At the end of tile protocol, Alice obtain $$\sum_i \sum_j (a_{ij} v_{ij} + r_{ij}) = \sum_i x_i y_i + \sum_{i,j} r_{ij}.$$

Bob has $$-\sum_{i,j} r_{ij}.$$

Thus, Alice and Bob have additive shares of the desired dot product.

Secure Inner Product Protocol Using Linear Transformation

The following protocol is based on Du et al. Define $x_1$ as the d/2-dimensional vector including the first d=2 elements of x, and $x_2$ as the vector including of the last d=2 elements of x. We note that $x^T y = x^T_1 y_1 + x^T_2 y_2$. Alice and Bob jointly generate a random invertible d×d matrix M. Alice determines $x'=x^T M$, splits the matrix as $x'_1$ and $x'_2$, and sends $x'_2$ to Bob. Bob determines $y'=M^{-1} y$, splits it as $y'_1$ and $y'_2$, and sends $y'_1$ to Alice. Alice determines $x'_1 y'_1$, and Bob determines $x'_2 y'_2$ so that their sum is equal to the desired result.

Secure Permute Protocol

The following protocol is based on Blake et al.

Input: Alice and Bob have d-component vectors x and y. Bob has a random permutation π.

Output; Alice and Bob obtain vectors q and s such that $q+s=\pi(x)+\pi(y)$.

Alice generates public and private keys for a homomorphic cryptosystem and sends the public key to Bob. Let E( ) denote encryption with Alice's public key.

Alice encrypts each element of x and sends the resulting vector $\bar{x}$ to Bob.

Bob generates a random vector r and determines a new vector θ where $\theta_i = \bar{x}_i E(r_i) = E(x_i + r_i)$, for i=1, ..., d.

Bob permutes θ and sends π(θ) to Alice. Alice decrypts the vector to obtain q.

Bob computes y−r, and then permutes the result using ft to obtain $s=\pi(y-r)$. Alice and Bob engage in the above permute protocol twice, the second time with their roles interchanged. After this is done, Alice and Bob have two vectors whose sum is a random permutation of the original sum, but neither of party knows the permutation.

EFFECT OF THE INVENTION

The embodiments of the invention provide privacy preserving hidden Markov model and Gaussian mixtures computations. We provide a privacy-preserving protocol for determining logsums. Using primitives for determining scalar products and maxima, we describe secure protocols for classification using Gaussian mixture models. We describe secure protocols for the forward-backward method, the Viterbi algorithm and HMM training, The protocols are defined modularly in terms of primitives so that future advances in cryptography, which may provide more robust and efficient protocols, can be readily employed in our framework by straightforward replacement.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for recognizing a speech unit stored at a client using hidden Markov models (HMMs) stored at a server, each HMM corresponds to a unit of recognizable speech, wherein the speech unit is represented as feature vectors, and wherein each feature vector is partitioned into two random additive shares such that the server receives only one random additive share from the client, the method comprising the steps of:

determining iteratively by the server, in response to receiving a random additive share of each feature vector, an additive share of a likelihood of the speech unit with respect to the each HMM using at least one secure multi-party computation protocol to produce additive shares of likelihoods of units of recognizable speech, wherein the secure multi-party computation protocol uses as inputs the two random additive shares of a corresponding feature vector, each of the two random additive shares is provided by the client and by the server respectively; and transmitting the additive shares of the likelihoods for recognizing the speech unit.

2. The method of claim 1, wherein the secure multi-party computation protocol is selected from a group consisting of a secure inner products protocol , a secure maximum index protocol, a secure maximum value protocol , a secure logsum protocol and a Gaussian mixture likelihood protocol.

3. The method of claim 1, further comprising:

determining by the server, an additive share of an index of a maximum likelihood of the unit of speech using a secure maximum index protocol; and transmitting the additive share of the index of the maximum likelihood to the client.

4. The method of claim 1, wherein the unit of speech includes at least some of letters, words, phonemes, syllables, and phrases, or combinations thereof.

5. The method of claim 1, wherein the likelihoods of the units of recognizable speech given a sequence of states of each HMM, is a single multivariate Gaussian distribution.

6. The method of claim 1, wherein the likelihood of the units of recognizable speech given a sequence of states of each HMM, is a mixture of multiple weighted multivariate Gaussian distributions.

7. The method of claim 1, wherein the cryptographic protocol is a secure logsum protocol (SLOG), and wherein the SLOG comprises:

determining an additive share of an inner product of exponents of the two random additive shares using a secure inner products protocol.

8. A server configured for recognizing a speech unit stored at a client using hidden Markov models (HMMs) stored at a server, each HMM corresponds to a unit of recognizable speech, wherein the speech unit is represented as feature vectors, and wherein each feature vector is partitioned into two random additive shares such that the server receives only one random additive share from the client, comprising:

means for determining iteratively by the server, in response to receiving a random additive share of each feature vector, an additive share of a likelihood of the speech unit with respect to the each HMM using at least one secure multi-party computation protocol to produce additive shares of likelihoods of units of recognizable speech, wherein the secure multi-party computation protocol uses as inputs the two random additive shares of a corresponding feature vector, each of the two random additive shares is provided by the client and by the server respectively; and means for transmitting the additive shares of the likelihoods for recognizing the speech unit.

9. The server of claim 8, wherein the secure multi-party computation protocol is selected from a group of a secure inner products protocol (SIP), a secure maximum index protocol (SMAX), a secure maximum value protocol (SVAL), a secure logsum protocol (SLOG) and a Gaussian mixture likelihood protocol (GML).

10. The server of claim 8, further comprising:
   means for determining by the server, an additive share of an index of a maximum likelihood of the unit of speech using a secure maximum index protocol (SMAX); and
   means for transmitting the additive share of the index of the maximum likelihood to the client.

11. The server of claim 8, wherein the unit of speech includes at least some of letters, words, phonemes, syllables, and phrases, or combinations thereof.

12. The server of claim 8, wherein the likelihood of the unit of speech given a sequence of states of each HMM is a single multivariate Gaussian distribution.

13. The server of claim 8, wherein the likelihood of the unit of speech given a sequence of states of each HMM is a mixture of multiple weighted multivariate Gaussian distributions.

14. The server of claim 8, wherein the cryptographic protocol is a secure logsum protocol (SLOG), and wherein the SLOG comprises:
   means for determining an additive share of an inner product of exponents of the two random additive shares using a secure inner products protocol (SIP).

\* \* \* \* \*